(12) United States Patent
Ishii

(10) Patent No.: US 8,787,273 B2
(45) Date of Patent: Jul. 22, 2014

(54) BASE STATION APPARATUS AND COMMUNICATION CONTROL METHOD

(75) Inventor: Hiroyuki Ishii, Kanagawa (JP)

(73) Assignee: NTT DoCoMo, Inc., Tokyo (JP)

(*) Notice: Subject to any disclaimer, the term of this patent is extended or adjusted under 35 U.S.C. 154(b) by 790 days.

(21) Appl. No.: 13/058,445

(22) PCT Filed: Aug. 11, 2009

(86) PCT No.: PCT/JP2009/064160
§ 371 (c)(1),
(2), (4) Date: Apr. 26, 2011

(87) PCT Pub. No.: WO2010/018819
PCT Pub. Date: Feb. 18, 2010

(65) Prior Publication Data
US 2011/0188428 A1 Aug. 4, 2011

(30) Foreign Application Priority Data
Aug. 11, 2008 (JP) .................... 2008-207517

(51) Int. Cl.
*H04W 4/00* (2009.01)
*H04W 72/04* (2009.01)
*H04W 76/04* (2009.01)

(52) U.S. Cl.
CPC .......... *H04W 72/04* (2013.01); *H04W 72/0406* (2013.01); *H04W 76/046* (2013.01); *H04W 76/048* (2013.01)
USPC .......................... 370/329; 370/311; 455/343.2

(58) Field of Classification Search
None
See application file for complete search history.

(56) References Cited

U.S. PATENT DOCUMENTS

| 7,916,675 B2 * | 3/2011 | Dalsgaard et al. | 370/311 |
| 8,315,194 B2 * | 11/2012 | Jeong et al. | 370/311 |
| 8,412,201 B2 * | 4/2013 | Park et al. | 455/436 |

(Continued)

FOREIGN PATENT DOCUMENTS

| WO | 2007/111941 A2 | 10/2007 |
| WO | 2007/145035 A1 | 12/2007 |

OTHER PUBLICATIONS

International Search Report w/translation from PCT/JP2009/064160 dated Nov. 17, 2009 (2 pages).

(Continued)

*Primary Examiner* — Bunjob Jaroenchonwanit
(74) *Attorney, Agent, or Firm* — Osha Liang LLP

(57) ABSTRACT

To avoid a collision between transmission timing of a data signal by SPS and transmission timing of an uplink control signal or a sounding reference signal, the base station apparatus has a DRX On-duration setting processing section configured to set reception duration of DRX control so as to minimize the total resource usage amount in the reception duration of DRX, and a control signal resource allocation section that allocates radio resources for a first signal in uplink for user equipment to transmit during On-duration of discontinuous reception to within predetermined time duration from the beginning of the ON-duration of discontinuous reception. The control signal resource allocation section allocates radio resources for an uplink control signal of CQI, scheduling request, etc. or sounding reference signal to the time duration (4 ms) between PDCCH for SPS and SPS PUSCH from the beginning of the reception duration of DRX control.

23 Claims, 14 Drawing Sheets

(56) References Cited

U.S. PATENT DOCUMENTS

| | | | | |
|---|---|---|---|---|
| 8,583,131 | B2* | 11/2013 | Ahluwalia | 455/450 |
| 8,594,035 | B2* | 11/2013 | Womack et al. | 370/329 |
| 2009/0073907 | A1* | 3/2009 | Cai | 370/311 |
| 2009/0122736 | A1* | 5/2009 | Damnjanovic et al. | 370/311 |
| 2009/0180414 | A1* | 7/2009 | Maeda et al. | 370/311 |
| 2010/0279715 | A1* | 11/2010 | Alanara et al. | 455/458 |
| 2011/0117948 | A1* | 5/2011 | Ishii et al. | 455/509 |
| 2011/0134782 | A1* | 6/2011 | Akimoto et al. | 370/252 |
| 2012/0170485 | A1* | 7/2012 | Maeda et al. | 370/252 |
| 2013/0223311 | A1* | 8/2013 | Wang et al. | 370/311 |

OTHER PUBLICATIONS

3GPP TS 36.211 V8.3.0; "3rd Generation Partnership Project; Technical Specification Group Radio Access Network; Evolved Universal Terrestrial Radio Access (E-UTRA); Physical Channels and Modulation"; May 2008 (77 pages).

3GPP TS 36.300 V8.5.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; May 2008 (134 pages).

Office Action issued in Japanese Patent Application No. 2010-524728, mailing date Oct. 1, 2013, with English translation thereof (6 pages).

* cited by examiner

| Persistent Sub-frame | #0 | #1 | #2 | #3 | #4 | #5 | #6 | #7 | #8 | #9 | #10 | #11 | #12 | #13 | #14 | #15 | #16 | #17 | #18 | #19 |
|---|---|---|---|---|---|---|---|---|---|---|---|---|---|---|---|---|---|---|---|---|
| RB USAGE AMOUNT | 2 | 3 | 8 | 7 | 10 | 4 | 6 | 5 | 2 | 5 | 10 | 11 | 8 | 7 | 10 | 4 | 6 | 5 | 2 | 5 |

FIG.6

| Persistent Sub-frame | #0 | #1 | #2 | #3 | #4 | #5 | #6 | #7 | #8 | #9 | #10 | #11 | #12 | #13 | #14 | #15 | #16 | #17 | #18 | #19 |
|---|---|---|---|---|---|---|---|---|---|---|---|---|---|---|---|---|---|---|---|---|
| RB USAGE AMOUNT | 2 | 3 | 8 | 7 | 10 | 4 | 6 | 5 | 2 | 5 | 10 | 11 | 8 | 7 | 10 | 4 | 6 | 5 | 2 | 5 |

FIG.10

BASE STATION APPARATUS AND COMMUNICATION CONTROL METHOD

TECHNICAL FIELD

The present invention relates to a mobile communication system, and more particularly, to a base station apparatus and communication control method in which discontinuous reception control and semi persistent scheduling (SPS) is applied to communications with user equipments.

BACKGROUND ART

The communication system that is a successor to the W-CDMA system and HSDPA system i.e. the LTE (Long Term Evolution) system has been studied by 3GPP that is the standardization group of W-CDMA, and the specification development work has proceeded.

In the LTE system, as a radio access scheme, OFDMA is used in downlink, and SC-FDMA (Single-Carrier Frequency Division Multiple Access) is used in uplink (for example, see Non-patent Document 1).

OFDMA is a system for dividing a frequency band into a plurality of narrow frequency bands (subcarriers), and allocating data onto each frequency band to perform transmission, actualizes high-speed transmission by densely arranging subcarriers in the frequency domain without interfering with one another even with part thereof overlapping, and is capable of enhancing spectral efficiency.

SC-FDMA is a transmission system for dividing the frequency band so that a plurality of terminals uses different frequency bands to perform transmission, and thereby enabling interference among the terminals to be reduced. SC-FDMA has the feature that the variation in the transmission power is decreased, and therefore, actualizes low power consumption in the terminal and wide coverage.

The LTE system is a system in which a plurality of mobile stations shares one, or two or more physical channels to perform communications both in uplink and downlink.

The channel shared by a plurality of mobile stations is generally referred to as the shared channel, and in the LTE system, is the "Physical Uplink Shared Channel (PUSCH)" in uplink, while being the "Physical Downlink Shared Channel (PDSCH)" in downlink.

Further, as a transport channel, the shared channels are the "Uplink Shared Channel (UL-SCH)" in uplink, and the "Downlink Shared Channel (DL-SCH)" in downlink.

Then, in the communication system using the above-mentioned shared channels, it is necessary to select a mobile station UE to assign a shared channel for each sub-frame (1 ms in the LTE system), and perform signaling to notify the selected mobile station UE of the assignment of the shared channel. In addition, the sub-frame may be also referred to as a TTI (Transmission Time Interval).

The control channel used for this signaling is referred to as the "Physical Downlink Control Channel (PDCCH)" or "Downlink L1/L2 Control Channel (DL L1/L2 Control Channel)" in the LTE system.

In addition, the processing for selecting a mobile station UE to assign a shared channel for each sub-frame is generally referred to as "scheduling". In this case, a mobile station UE to assign the shared channel is dynamically selected for each sub-frame, and the processing may be referred to as "dynamic scheduling". Further, "assign a shared channel" may be expressed by "allocate radio resources for the shared channel".

For example, the information of the Physical Downlink Control Channel includes "downlink scheduling information", "uplink scheduling grant", etc. (for example, see Non-patent Document 2).

For example, the "downlink scheduling information" includes the allocation information of downlink resource block, ID of the UE, the number of streams, information on the precoding vector, data size, modulation scheme, information on HARQ (hybrid automatic repeat request), etc concerning the shared channel in downlink. In addition, the downlink scheduling information may be also referred to as downlink scheduling grant or downlink assignment information.

Further, for example, the "uplink scheduling grant" includes assignment information of uplink resource block, ID of the UE, data size, modulation scheme, transmission power information in uplink, information of demodulation reference signal in uplink MIMO, etc concerning the shared channel in uplink.

In addition, the above-mentioned "downlink scheduling information" and "uplink scheduling grant" may be collectively referred to as "downlink control information (DCI)".

Meanwhile, in semi persistent scheduling (SPS) studied to actualize VoIP, etc., with respect to the downlink, it is configured that a radio base station eNB assigns downlink radio resources (PDSCH) to a mobile station UE in a fixed manner at predetermined intervals, starting at a sub-frame (assignment start time), as a starting point, in which the downlink scheduling information is transmitted to the mobile station UE via the PDCCH. Further, with respect to the uplink, the radio base station (eNB) assigns uplink radio resources (PUSCH) to a user equipment in a fixed manner at predetermined intervals, starting at a sub-frame (assignment start time), as a starting point, transmitted 4 ms after a sub-fame in which the uplink scheduling grant is transmitted to the user equipment via the PDCCH.

Further, in uplink of the LTE system, radio resources are assigned to each user equipment for a control signal of downlink radio quality information, scheduling request, etc. The downlink radio quality information is referred to as the channel quality indicator (CQI), and based on the CQI, the base station apparatus performs the above-mentioned dynamic scheduling and semi persistent scheduling. The scheduling request is a signal for the user equipment to request the base station apparatus to assign uplink radio resources. Further, in addition to the above-mentioned control signal, radio resources for a sounding reference signal may be allocated to each user equipment. Herein, the sounding reference signal is a reference signal (or a pilot signal) used in uplink scheduling and transmission power control, for example.

The control signal of the CQI, scheduling request and the like is transmitted with the PUCCH (Physical Uplink Control Channel) in a sub-frame in which the Uplink Shared Channel (UL-SCH) is not transmitted. Meanwhile, the control signal of the CQI, scheduling request and the like is multiplexed onto the Uplink Shared Channel (UL-SCH) and transmitted in a sub-frame in which the Uplink Shared Channel (UL-SCH) is transmitted.

In addition, in LTE, discontinuous reception (DRX) control is applied. The discontinuous reception control is applied in the case that the base station apparatus and the user equipment are connected with each other and that data to communication does not exit, and the user equipment in the discontinuous reception state receives the Physical Downlink Control Channel (PDCCH) periodically i.e. intermittently. In this case, it is essential only that the user equipment receives the Physical Downlink Control Channel (PDCCH) intermittently instead of all the timing, and it is thereby possible to reduce power consumption in the battery (battery saving). The time duration to intermittently receive the Physical Downlink Control Channel (PDCCH) in the above-mentioned discontinuous reception control is referred to as ON duration of DRX or On-duration. Further, a cycle to set the On-duration is referred to as the DRX cycle.

In addition, in order to enhance the effect of the above-mentioned battery saving, the above-mentioned control signal of the CQI, scheduling request, etc. is only transmitted during the On-duration when the discontinuous reception control is performed.

FIG. 12 shows an image diagram of SPS and DRX control. In the figure, the DRX cycle and the transmission interval of SPS are 20 ms, and the length of On-duration is 7 ms. With respect to DRX control, sub-frames with sub-frame numbers of "n×20~n×20+6 (in addition, n is an integer)" are set for On-duration. Further, in SPS, the uplink scheduling grant for SPS is transmitted in sub-frame number 4 from the base station apparatus to the user equipment, and uplink radio resources (PUSCH) are allocated in a fixed manner to the user equipment at 20 ms-intervals starting from sub-frame number 8 four sub-frames after the sub-frame of sub-frame number 4.

CITATION LIST

Non-Patent Literature

Non-Patent Literature 1
3GPP TS 36.211 (V8.3.0), "Physical Channel and Modulation", May 2008
Non-Patent Literature 2
3GPP TS 36.300 (V8.5.0), "E-UTRA and E-UTRAN Overall description", May 2008

SUMMARY OF INVENTION

Technical Problem

As described above, the control signal of the CQI, scheduling request, etc. is only transmitted during the ON-duration of discontinuous reception control. Further, the control signal of the CQI, scheduling request, etc. is transmitted on the PUCCH (Physical Uplink Control Channel) in a sub-frame in which the Uplink Shared Channel (UL-SCH) is not transmitted. Meanwhile, the control signal of the CQI, scheduling request, etc. is multiplexed onto the Uplink Shared Channel (UL-SCH) and transmitted in a sub-frame in which the Uplink Shared Channel (UL-SCH) is transmitted.

However, as shown in FIG. 13, when the allocation of uplink radio resources (PUSCH) by SPS is in sub-frames of sub-frame number=n×20+5, and the allocation of radio resources for the CQI or scheduling request is in sub-frames of sub-frame number=n×20+5, the control signal of the CQI, scheduling request and the like is always multiplexed onto the Uplink Shared Channel (UL-SCH) and transmitted. In this case, since the control signal of the CQI, scheduling request and the like is always multiplexed onto the Uplink Shared Channel (UL-SCH) and transmitted, the number of symbols (or the number of resource elements) allocated to the Uplink Shared Channel (UL-SCH) decreases, the coding rate increases, and as a result, the problem occurs that transmission characteristics deteriorate in the Uplink Shared Channel (UL-SCH).

Meanwhile, the allocation of time resources is performed flexibly in performing the allocation of uplink radio resources (PUSCH) by SPS. In other words, the allocation of uplink radio resources (PUSCH) by SPS is performed flexibly during the time duration determined by On-duration of discontinuous reception control. However, when the allocation of uplink radio resources (PUSCH) by SPS is performed while avoiding sub-frames in which the control signal of the CQI, scheduling request, etc. is transmitted, the flexibility deteriorates, and as a result, efficiency of the resource allocation by SPS is impaired. Further, also when acknowledge information for downlink radio resources (PDSCH) by SPS is transmitted in the same sub-frame as that of the control signal of the CQI, scheduling request, etc., the acknowledge information is multiplexed into the control signal of the CQI, scheduling request, etc. and transmitted. In this case, as in the above-mentioned uplink case, the problem arises that transmission characteristics of the acknowledgment information deteriorate. Meanwhile, when the allocation of downlink radio resources (PDSCH) by SPS is performed so that the sub-frame to transmit the acknowledgment information and the sub-frame to transmit the control signal of the CQI, scheduling request, etc. do not collide with each other, deterioration of the flexibility occurs in the allocation of downlink radio resources (PDSCH) by SPS, and as a result, efficiency of the resource allocation by SPS is impaired. Further, when the sub-frame to transmit the acknowledgment information and a sub-frame to transmit a sounding reference signal collide with each other, the user equipment performs the operation of transmitting only the acknowledgment information while not transmitting the sounding reference signal, or not transmitting a signal to which the acknowledgment information is mapped in an SC-FDMA symbol in which the sounding reference signal is transmitted, and uplink transmission characteristics thereby deteriorate.

Therefore, the present invention was made in view of the above-mentioned problems, and it is an object of the invention to provide a base station apparatus and communication control method for enabling avoidance of a collision between transmission timing of an uplink data signal by SPS or transmission timing of acknowledgment information for a downlink data signal by SPS and transmission timing of an uplink control signal or a sounding reference signal.

Solution to Problem

A base station apparatus of the invention is characterized by having a setting section configured to set On-duration of discontinuous reception on a user equipment under controlling discontinuous reception, and an assigning section configured to allocate radio resources for a first signal in uplink for the user equipment to transmit during the On-duration of discontinuous reception to within predetermined time duration from the beginning of the ON-duration of discontinuous reception.

According to this constitution, radio resources for a first signal in uplink are allocated to within the predetermined time duration from the beginning of the ON-duration of discontinuous reception. For example, even when SPS is applied, uplink radio resources are not allocated during the predetermined time duration from the beginning of the ON-duration of discontinuous reception. Accordingly, efficiency of the resource allocation in SPS is not impaired, and further, it is possible to solve the problem that transmission characteristics deteriorate in the shared channel in uplink.

Technical Advantage of the Invention

According to the invention, it is possible to provide a radio communication system for enabling avoidance of a collision between transmission timing of a data signal by SPS or transmission timing of acknowledgment information for a data signal and transmission timing of an uplink control signal or a sounding reference signal without impairing efficiency of the resource allocation in SPS and further without any deteriorations in transmission characteristics occurring in the shared channel in uplink nor in the acknowledgment information for the shared channel in downlink.

BRIEF DESCRIPTION OF DRAWINGS

FIG. 6 is an explanatory view illustrating DRX On-duration setting processing in the base station apparatus according to an Embodiment;

FIG. 10 is an explanatory view illustrating DRX On-duration setting processing in the base station apparatus according to an Embodiment;

DESCRIPTION OF EMBODIMENTS

Figure 1:
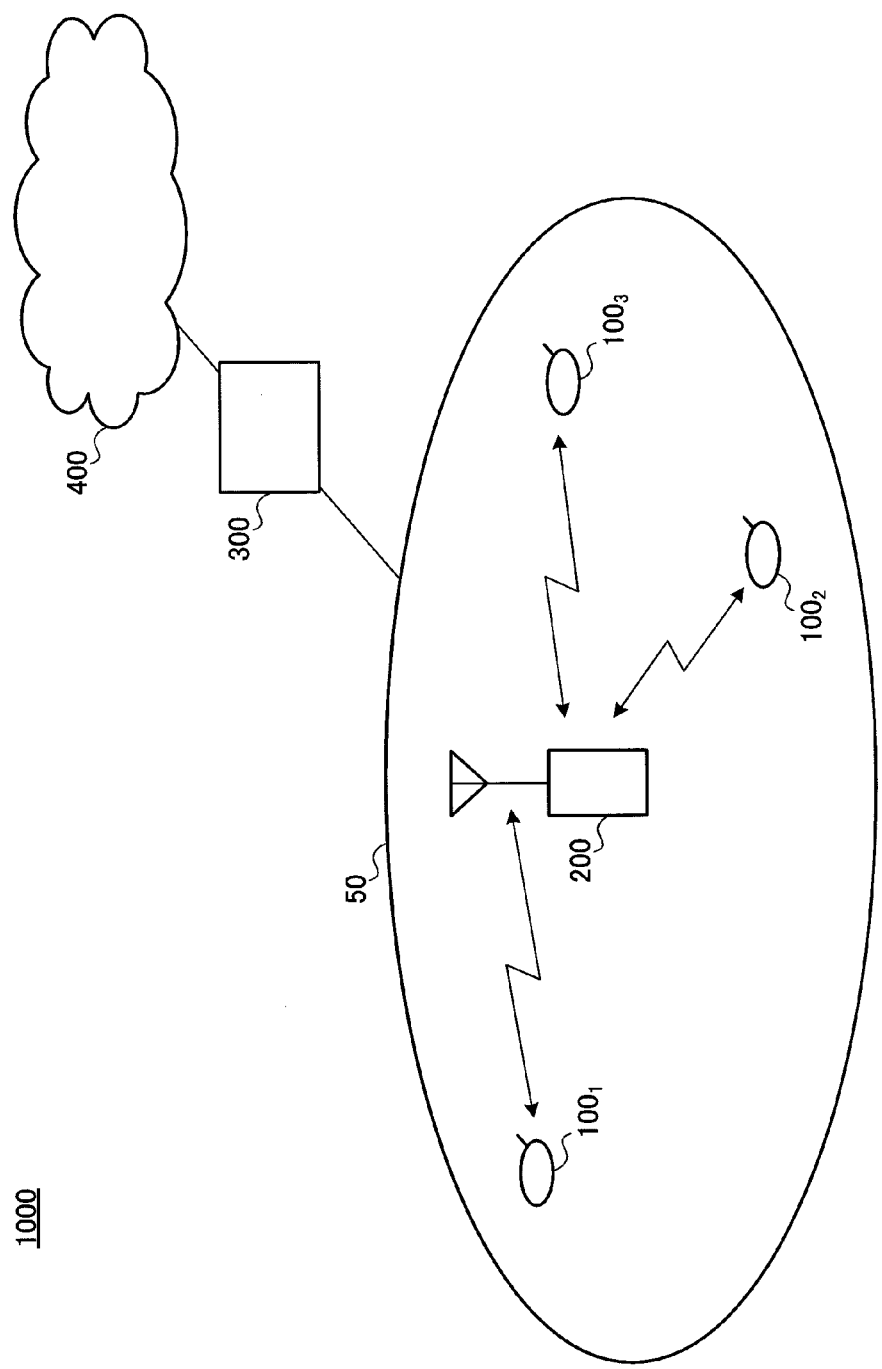
FIG. 1 is an explanatory view showing a communication system according to an Embodiment.

An Embodiment of the invention will specifically be described below with reference to accompanying drawings. In addition, in all the diagrams to explain the Embodiment, components having the same functions are assigned the same reference numerals to omit redundant descriptions thereof.

A radio communication system to which a radio base station according to the Embodiment of the invention is applied will be described with reference to FIG. 1.

A radio communication system 1000 is a system to which Evolved UTRA and UTRAN (alias: Long Term Evolution, or Super 3G) is applied, for example, and is provided with a base station apparatus (eNB: e Node B) 200 and a plurality of user equipment (UE, or referred to as a mobile station) 100 ($100_1$, $100_2$, $100_3$, ..., $100_n$, n is an integer where n>0).

The base station apparatus 200 is connected to an upper station, for example, access gateway apparatus 300, and the access gateway apparatus 300 is connected to a core network 400. Herein, the user equipment 100 communicates with the base station apparatus 200 in a cell 50 by Evolved UTRA and UTRAN. In addition, the access gateway may be also referred to as MME/SGW (Mobility Management Entity/Serving Gateway).

In the following description, the user equipment 100 ($100_1$, $100_2$, $100_3$, $100_n$, . . . , $100_n$) has the same configuration, function and state, and is descried as the user equipment 100 below to give an explanation unless otherwise specified.

In the radio communication system 1000, as a radio access scheme, OFDMA (Orthogonal Frequency Division Multiplexing Access) is applied in downlink, while SC-FDMA (Single-Carrier Frequency Division Multiple Access) is applied in uplink. As described above, OFDMA is a system for dividing a frequency band into a plurality of narrow frequency bands (subcarriers), and allocating data onto each frequency band to perform transmission. SC-FDMA is a transmission system for dividing the frequency band so that a plurality of terminals uses different frequency bands to perform transmission, and thereby enabling interference among the terminals to be reduced.

Described herein are communication channels in Evolved UTRA and UTRAN.

In downlink, used are the Physical Downlink Shared Channel (PDSCH) shared among the user equipment 100, and the Physical Downlink Control Channel (PDCCH). The Physical Downlink Control Channel is also referred to as the downlink L1/L2 control channel. Further, the information mapped to the PDCCH may be also referred to as the downlink control information (DCI). By the Physical Downlink Shared Channel, user data i.e. normal data signals are transmitted. In addition, a transport channel mapped to the PDSCH is the Downlink Shared Channel (DL-SCH).

Further, the downlink scheduling information, uplink scheduling grant, transmission power control command bit, etc. are transmitted on the PDCCH. For example, the downlink scheduling information (DL scheduling information) includes an ID of a user that performs communications using the PDSCH, and information of transport format of the user data. The information of transport format includes information on the data size, modulation scheme and HARQ, allocation information of resource block in downlink, etc. For example, the uplink scheduling grant (UL scheduling grant) includes an ID of a user that performs communications using the PUSCH, and information of transport format of the user data. The information of transport format includes information on the data size and modulation scheme, allocation information of resource block in uplink, information on the transmission power of the shared channel in uplink, etc. Herein, the resource block in uplink corresponds to frequency resources, and may be also referred to as a resource unit.

OFDM symbols to which the PDCCH is mapped include the Physical Control Format Indictor Channel (PCFICH) and Physical HARQ Indicator Channel (PHICH). In other words, the PDCCH, PCFICH and PHICH are multiplexed into the predetermined or less number of OFDM symbols from the beginning of a sub-frame and transmitted. The PCFICH is a channel to notify the UE of the number of OFDM symbols with the PDCCH mapped thereto. The PHICH is a channel to transmit acknowledgment information for the PUSCH. The PCFICH and PHICH may be defined as channels in parallel relation to the PDCCH, or defined as information elements included in the PDCCH.

In uplink, used are the Physical Uplink Shared Channel (PUSCH) shared among the user equipment 100, and the Physical Uplink Control Channel. By the Physical Uplink Shared Channel, user data i.e. normal data signals are transmitted. In addition, a transport channel mapped to the PUSCH is the Uplink Shared Channel (UL-SCH). Further, on the Physical Uplink Control Channel (PUCCH) is transmitted downlink quality information (CQI: Channel Quality Indicator) used in the scheduling processing for the shared channel and adaptive modulation and coding (AMC: Adaptive Modulation and Coding) in downlink, and the acknowledgement information for the Physical Downlink Shared Channel. The content of the acknowledgment information is expressed by either a positive response (ACK: Acknowledgement) indicating that the transmission signal is properly received, or a negative response (NACK: Negative Acknowledgement) indicating that the signal is not properly received.

On the Physical Uplink Control Channel, a scheduling request for requesting resource allocation of the shared channel in uplink may be transmitted in addition to the CQI and acknowledgement information. Herein, the resource allocation of the shared channel in uplink means that the base station apparatus 200 notifies the user equipment 100 that the user equipment 100 is allowed to perform communications using the shared channel in uplink in a subsequent sub-frame, using the Physical Downlink Control Channel (uplink scheduling grant) in some sub-frame.

In addition, the user equipment 100 transmits the shared channel in uplink four sub-frames after the sub-frame in which the uplink scheduling grant is received.

In addition, the CQI, acknowledgement information, and scheduling request are multiplexed onto the PUSCH and transmitted, when the PUSCH is transmitted.

In downlink, a downlink reference signal (DL RS) is transmitted as a pilot signal used among the UE for common use. The DL RS is used in channel estimation for decoding of the PDSCH, PDCCH, PCFICH and PHICH, and in calculation of the CQI that is the downlink radio quality information.

Further, in uplink, a demodulation reference signal and sounding reference signal are transmitted as a pilot signal. The demodulation reference signal is a reference signal multiplexed onto the PUSCH or PUCCH, and is used in channel estimation for decoding of the PUSCH or PUCCH, etc. Meanwhile, the sounding reference signal is a reference signal to measure the uplink radio quality. More specifically, based on the SIR of the sounding reference signal transmitted from the user equipment, the base station apparatus may perform uplink transmission power control, uplink adaptive modulation and coding control (AMC control), uplink timing adjustment control, etc. The sounding reference signal is a signal transmitted periodically, and the allocation of radio resources therefor is performed by the base station apparatus designating to the user equipment using an RRC message.

Figure 2:
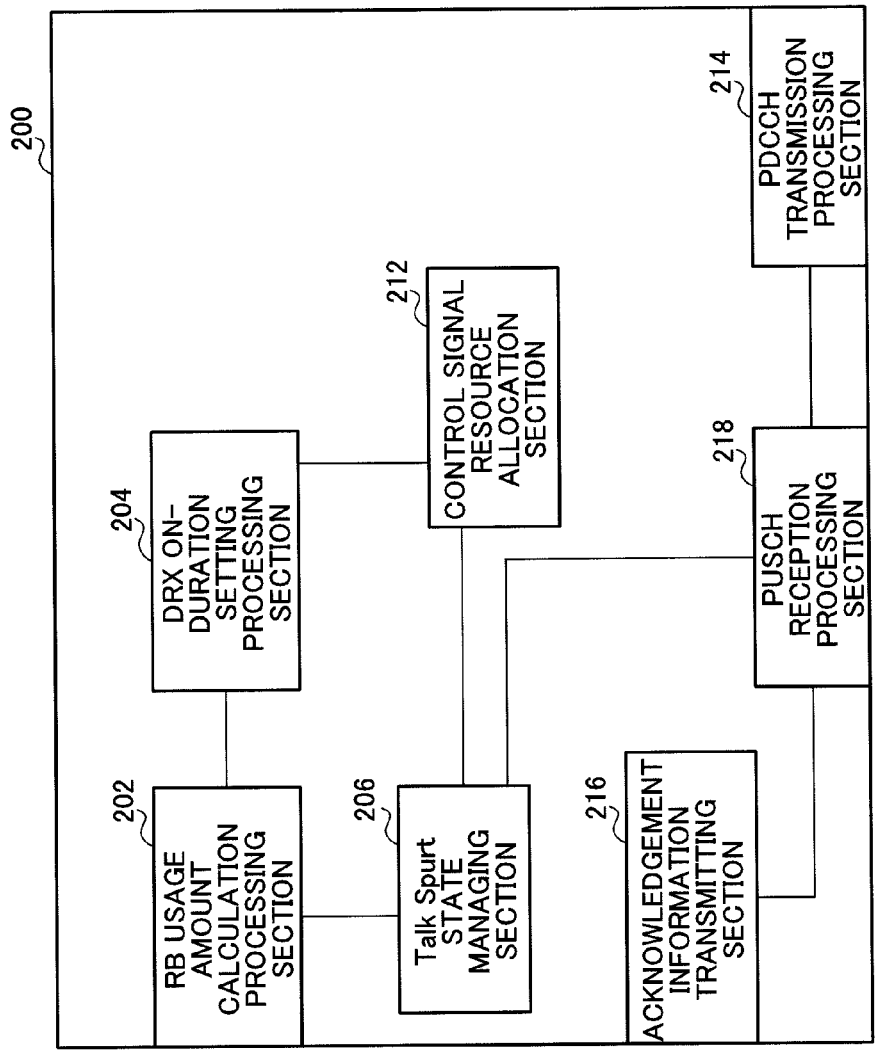
FIG. 2 is a partial block diagram concerning uplink illustrating a base station apparatus according to an Embodiment.

The base station apparatus 200 according to this Embodiment will be described with reference to FIG. 2.

In this Embodiment, descriptions are given separately on downlink and uplink, for convenience in description. The uplink will be described with reference to FIG. 2.

The base station apparatus 200 according to this Embodiment receives uplink data from the user equipment 100, using uplink radio resources assigned in a fixed manner at predetermined intervals starting at the assignment start time as a starting point. The uplink radio resources may include radio resources to transmit the PUCCH and radio resources to transmit the PUSCH.

The base station apparatus according to this Embodiment has an RB usage amount calculation processing section 202, DRX On-duration setting processing section 204, Talk Spurt state managing section 206, control signal resource assignment section 212, PDCCH transmission processing section 214, acknowledgement information transmitting section 216 and PUSCH reception processing section 218.

The RB usage amount calculation processing section 202 calculates a usage amount of resources concerning sub-frames within a transmission cycle in Semi Persistent Scheduling. The transmission cycle may be a predetermined cycle. The sub-frame may be also referred to as a time frame. Herein, the resources include frequency resources. The resource usage amount includes the amount or the number of resource blocks. For example, in the LTE system, one resource block is 180 KHz. Further, one sub-frame is 1 ms. For example, when the predetermined cycle is 20 ms, the RB usage amount calculation processing section 202 calculates a resource usage amount on each sub-frame of 20 sub-frames.

The DRX On-duration setting processing section 204 sets the reception duration of discontinuous reception in each user equipment 100 inside the cell. The reception duration is the On-duration of the DRX state. For example, the DRX On-duration setting processing section 204 sets the DRX On-duration based on the resource usage amount calculated in the RB usage amount calculation processing section 202. For example, the DRX On-duration setting processing section 204 may set the DRX On-duration so as to minimize the total resource usage amount within the set DRX On-duration.

Alternately, instead of setting the DRX On-duration based on the resource usage amount, the DRX On-duration setting processing section 204 may set the DRX On-duration based on the number of user equipments under the DRX On-duration per each sub-frame. More specifically, the section 204 may set the DRX On-duration so as to minimize "the number of user equipments under the DRX On-duration" within the DRX On-duration. Alternately, the section 204 may set the DRX On-duration based on the number of user equipments at the starting point of the DRX On-duration per each sub-frame. More specifically, the section 204 may set the DRX On-duration so that the sub-frame such that "the number of user equipments at the starting point of the DRX On-duration" is the lowest is the starting point of the DRX On-duration.

By setting the DRX On-duration as described above, it is possible to smooth the resource usage amount of each sub-frame. In addition, in the above-mentioned processing, the DRX On-duration is set so as to smooth the resource usage amount of each sub-frame, and as a substitute therefor, the DRX On-duration may be set using other algorithms.

The Talk Spurt state managing section 206 manages the Talk Spurt state of each UE in the cell i.e. whether or not to perform resource allocation by Semi Persistent Scheduling. Herein, in the resource allocation in Semi Persistent Scheduling, uplink data is transmitted using uplink radio resources allocated in a fixed manner at predetermined intervals from the allocation starting time as the starting point. The uplink radio resources include the PUSCH. In addition, the allocation starting time is a sub-frame 4 ms after the sub-frame in which the uplink scheduling grant for the resource allocation by Semi Persistent Scheduling is received in the UE.

The PUSCH reception processing section 218 receives the uplink data, which is transmitted from the user equipment 100 such that the Talk Spur state is ON using uplink radio resources allocated in a fixed manner at predetermined intervals from the allocation starting time as the starting point. The uplink radio resources include the PUSCH.

The acknowledgement information transmitting section 216 transmits the acknowledgement information for the uplink radio resources. The uplink radio resources include the PUSCH.

Figure 3A:
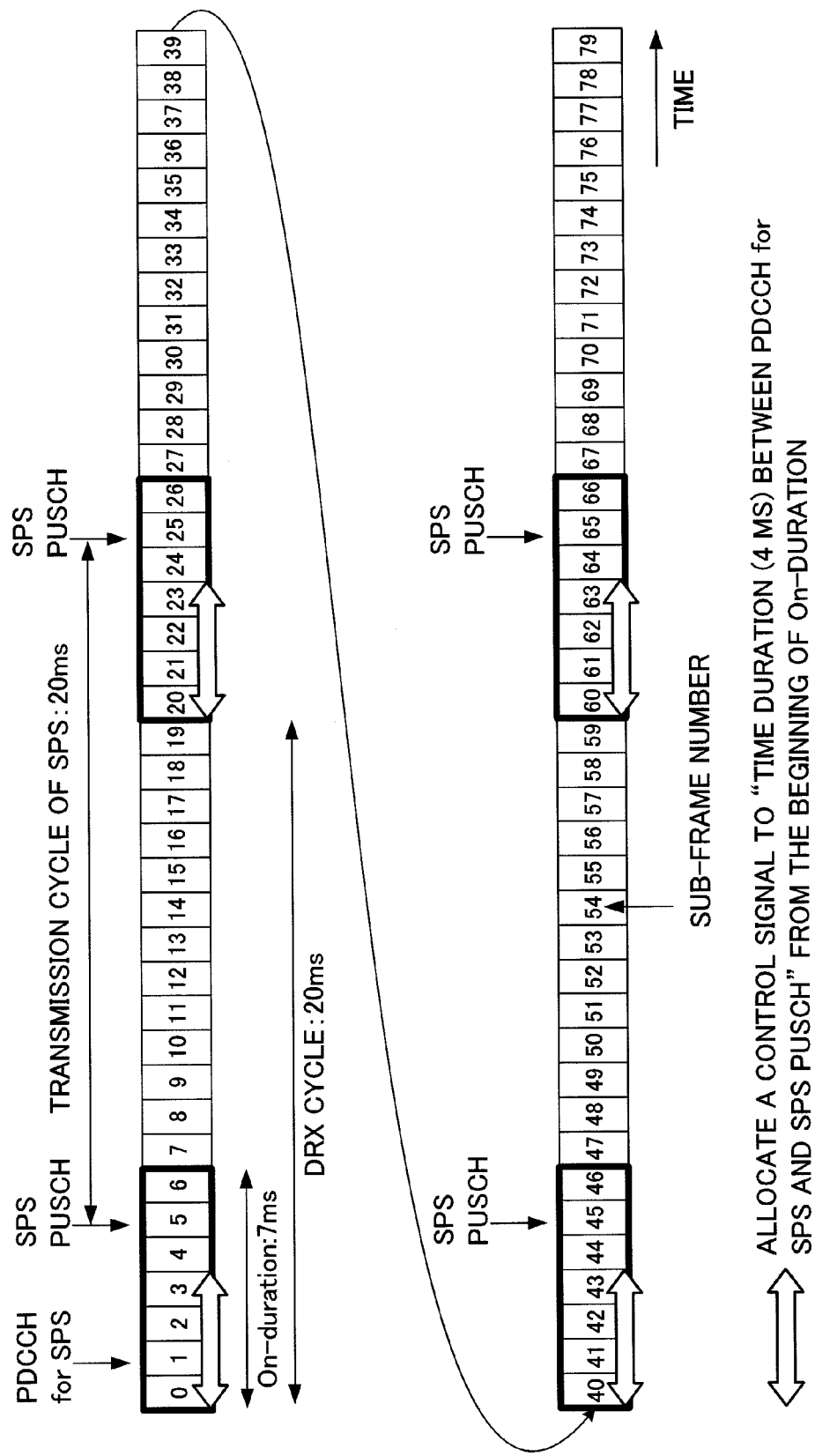
FIG. 3A is an explanatory view illustrating an allocation range of an uplink control signal in DRX On-duration.

The control signal resource allocation section 212 allocates radio resources for an uplink control signal for the user equipment 100 to transmit during the On-duration of the DRX state to within the predetermined time duration (hereinafter, referred to as a first predetermined period) from the beginning of the On-duration of the DRX state. The uplink control signal may be at least one of the downlink radio quality information, and scheduling request. Particularly, for the user equipment to which is applied Semi Persistent Scheduling, it is desirable to allocate to within the predetermined time duration (first predetermined period) from the beginning of the On-duration of the DRX state, in which radio resources for an uplink data signal are not allocated. More specifically, as shown in FIG. 3A, the control signal resource allocation section 212 allocates radio resources for an uplink control signal to a sub-frame within the predetermined time duration (first predetermined period) from the beginning of the On-duration of DRX control. In an example as shown in FIG. 3A, the DRX cycle and the transmission cycle of SPS are 20 ms, and the length of the On-duration is 7 ms. With respect to DRX control, sub-frames with sub-frame numbers of "n×20~n×20+6 (in addition, n is an integer)" are set for On-duration. Further, in SPS, the uplink scheduling grant for SPS is transmitted in sub-frame number 1 from the base station apparatus to the user equipment, and uplink radio resources (PUSCH) are allocated in a fixed manner to the user equipment at 20 ms-intervals from sub-frame number 5 four sub-frames after the sub-frame.

Herein, from the viewpoint of ensuring flexibility of time resources, the uplink scheduling grant (PDCCH) for SPS is capable of being transmitted at any timing (sub-frame number=n×20~n×20+6) within the On-duration of the DRX state. When the uplink scheduling grant for SPS is transmitted in sub-frame number 0 that is the beginning of the On-duration of DRX control, uplink radio resources (PUSCH) are allocated in a fixed manner to the user equipment at 20 ms-intervals from sub-frame number 4 four sub-frames after the sub-frame. In other words, uplink radio resources (PUSCH) are not allocated during the first predetermined period (four sub-frames in SPS exemplified in FIG. 3A) from the beginning of the On-duration of DRX control. Accordingly, when radio resources for an uplink control signal are allocated to the first predetermined period (four sub-frames in SPS exemplified in FIG. 3A) from the beginning of the On-duration of DRX control, it is possible to ensure flexibility of time resources allocated to the PDCCH, and reliably avoid a collision between transmission timing of an uplink control signal and transmission timing of an uplink data signal by SPS.

In addition, the value of four sub-frames as described above is an example, and can be any values other than four sub-frames. Further, the time relationship such that the user equipment transmits uplink radio resources (PUSCH) in a sub-frame four sub-frames after the sub-frame in which the base station apparatus transmits the uplink scheduling grant to the user equipment is not limited to Semi Persistent Scheduling, and is also applied in Dynamic Scheduling.

In addition, in the above-mentioned example, the control signal resource allocation section 212 allocates radio resources for an uplink control signal to the first predetermined period (four sub-frames in SPS exemplified in FIG. 3A) from the beginning of the On-duration of DRX control, and as a substitute therefor, may allocate radio resources for an uplink control signal to the time duration except a second predetermined period from the beginning of the On-duration of DRX control within the first predetermined period from the beginning of the On-duration of DRX control. For example, two sub-frames from the beginning may be set for the second predetermined period within the above-mentioned first predetermined period (four sub-frames). In this case, in the example of FIG. 3A, the radio resources for an uplink control signal are allocated in sub-frame numbers 2+20n or 3+20×n. In other words, the sub-frames of the second predetermined period from the first sub-frame within the On-duration of DRX control are omitted from candidates to which the radio resources for an uplink control signal are allocated.

Herein, described below is the effect of omitting the sub-frames of the second predetermined period from the first sub-frame within the On-duration of DRX control from candidates to which the radio resources for an uplink control signal are allocated.

For example, the CQI is downlink radio quality information that is calculated in the user equipment 100 based on the downlink reference signal DL RS or the like. Accordingly, the user equipment 100 needs to perform the calculation processing of CQI in a sub-frame before a sub-frame to transmit the CQI. In this case, for example, when uplink radio resources for the CQI are allocated to the beginning of the On-duration, the user equipment 100 needs to perform the calculation processing of CQI in a sub-frame before the On-duration. This means that the effect of battery saving by DRX control as described previously is reduced. Accordingly, as described above, by omitting the sub-frames of the second predetermined period from the first sub-frame within the On-duration of DRX control from candidates to which the radio resources for an uplink control signal are allocated, it is possible to maintain the battery saving effect of the user equipment.

In addition, the second predetermined period may be determined based on the measurement interval of CQI in the user equipment 100. For example, when the measurement interval of CQI is 2 ms, the second predetermined period may be set at 2 ms. In this case, the user equipment 100 may measure or calculate the CQI during the second predetermined period.

In addition, the above-mentioned processing of omitting the second predetermined period within the first predetermined period from candidates to which radio resources for an uplink control signal are allocated may be applied only to the CQI without being applied to the scheduling request. In other words, whether or not to define the second predetermined period may be based on the type of control signal.

The control signal resource allocation section 212 notifies the user equipment 100 of the radio resources for an uplink control signal allocated by the above-mentioned processing. For example, the information on the radio resources for an uplink control signal may be notified to the user equipment 100 as part of the control information included in RRC Message. In this case, the user equipment 100 transmits the uplink control signal (CQI and scheduling request) using the notified radio resources for the uplink control signal.

In addition, as well as the control signal of CQI, scheduling request, etc., also with respect to a sounding reference signal, the control signal resource allocation section 212 may allocate the radio resources to within the predetermined time interval (first predetermined period) from the beginning of the On-duration of the DRX state. In other words, more specifically, as shown in FIG. 3A, the control signal resource allocation section 212 may allocate the radio resources for a sounding reference signal to a sub-frame within the predetermined time duration (first predetermined period, 4 ms in FIG. 3A) from the beginning of the On-duration of DRX control.

Described below is the effect of allocating the radio resources also for a sounding reference signal to within the predetermined time duration (first predetermined period) from the beginning of the On-duration of the DRX state.

Generally, the transmission power of the sounding reference signal differs from the transmission power of the PUSCH. Accordingly, when both of the sounding reference signal and PUSCH are transmitted in the same sub-frame, the variation of the transmission power occurs between an SC-FDMA symbol to transmit the sounding reference signal and an SC-FDMA symbol to transmit the PUSCH. Generally, when the variation occurs in the transmission power, the signal quality deteriorates in between prior and subsequent to the instant of the variation. In other words, there is a case that the quality of the PUSCH and the sounding reference signal deteriorates due to the variation in the transmission power. Conversely, by allocating the radio resources for a sounding reference signal to within the predetermined time interval (first predetermined period) from the beginning of the On-duration of the DRX state, it is possible to avoid transmission of the sounding reference signal and PUSCH in the same sub-frame, and as a result, it is possible to prevent the deterioration from occurring.

In addition, also with respect to the sounding reference signal, the processing may be performed for allocating the radio resources to the time duration except the second predetermined period from the beginning of the On-duration of DRX control within the first predetermined period from the beginning of the On-duration of DRX control.

Further, also with respect to the sounding reference signal, the information on the radio resources may be notified to the user equipment 100 as part of the control information included in RRC Message.

The PDCCH transmission processing section 214 transmits the uplink scheduling grant to the user equipment, when it is determined that resources for initial transmission for Semi Persistent Scheduling is notified. The uplink scheduling grant includes an allocation signal in a fixed manner. The uplink scheduling grant is mapped to the PUCCH.

Figure 4:
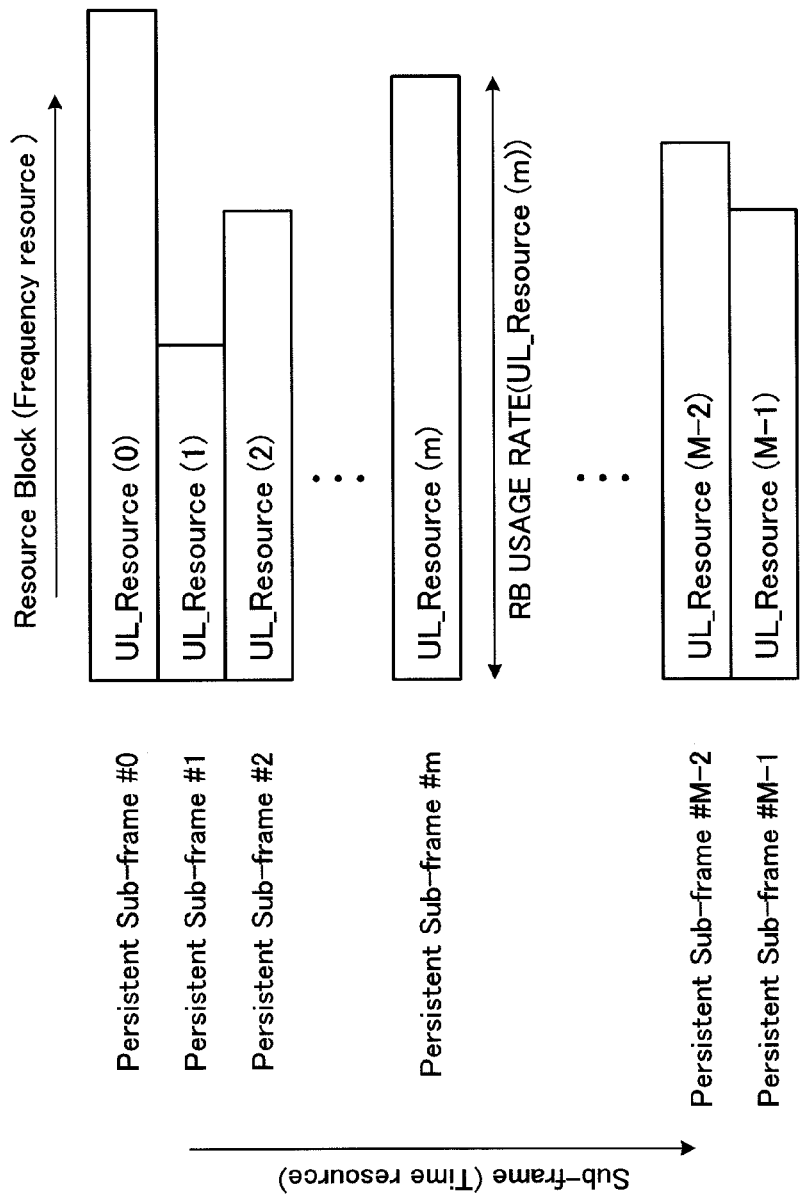
FIG. 4 is an explanatory view illustrating processing for calculating a resource block usage amount in the base station apparatus according to an Embodiment.

The processing for calculating a resource block usage amount performed in the RB usage amount calculation processing section 202 will specifically be described below with reference to FIG. 4.

A sub-frame within a predetermined period is defined as a Semi Persistent sub-frame. The RB usage amount calculation processing section 202 calculates a resource usage amount for each Semi Persistent sub-frame. In FIG. 4, the resource usage amount is shown by UL_Resource (m) (m is 0 or an integer of 0<m). In FIG. 4, m represents an index of the Semi Persistent sub-frame. In FIG. 4, M represents the total number of Semi Persistent sub-frames i.e. represents the total number of sub-frames included in the predetermined period.

The resource usage amount UL_Resource (m) for each Semi Persistent sub-frame corresponds to the number of resource blocks (RB) allocated to the Random Access Channel (RACH), RACH Message 3 (message for the Random Access Channel) and the UL-SCH to which is applied Semi Persistent scheduling and the number of guard RBs in Semi Persistent sub-frame #m.

Figure 5:
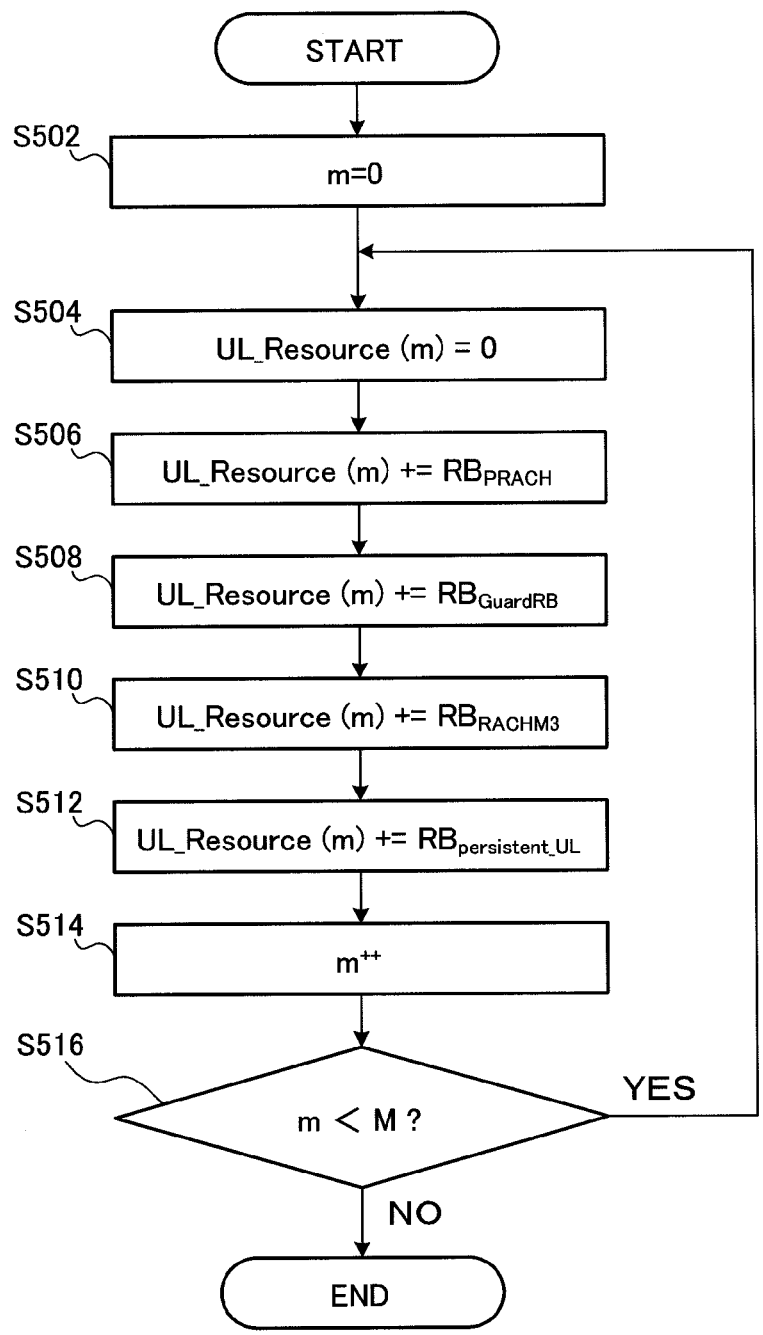
FIG. 5 is a flow diagram illustrating the processing for calculating a resource block usage amount in the base station apparatus according to an Embodiment.

The processing flow in the RB usage amount calculation processing section 202 will be described with reference to FIG. 5.

The index of the Semi Persistent sub-frame is set at "0" (step S502).

The value of UL_Resource (m) in Semi Persistent sub-frame #m is initialized (step S504).

To the value of UL_Resource (m) is added a value of resource block $RB_{PRACH}$ used in the Random Access Channel (step S506). The resource block $RB_{PRACH}$ used in the Random Access Channel is calculated based on whether or not the PRACH (Physical Random Access Channel) is transmitted in the Semi Persistent sub-frame #m. For example, when the PRACH is transmitted in the Semi Persistent sub-frame #m, $RB_{PRACH}$ is set at "6". When the PRACH is not transmitted in the Semi Persistent sub-frame #m, $RB_{PRACH}$ is set at "0". By the processing step S506, when the PRACH is transmitted in the Semi Persistent sub-frame #m, the number of resource blocks allocated to the PRACH is counted as resource usage amount UL_Resource (m).

To the value of UL_Resource (m) is added a value of resource block $RB_{GuarddRB}$ used in guard resource blocks (step S508). The resource block $RB_{GuarddRB}$ used in guard resource blocks is the number of Guard RBs (guard resource blocks) allocated in the Semi Persistent sub-frame #m. In other words, the number of Guard RBs allocated in the Semi Persistent sub-frame #m is counted. By the processing of step S508, the number of Guard RBs allocated in the Semi Persistent sub-frame #m is counted as resource usage amount UL_Resource (m). In addition, as a substitute for the number of Guard RBs, the number of PUCCHs may be counted as resource usage amount UL_Resource (m).

To the value of UL_Resource (m) is added a value of resource block $RB_{RACHM3}$ used in RACH message 3 (step S510). The resource block $RB_{RACHM3}$ used in RACH message 3 is calculated based on the time average value ($RB_{RACHM3,average}$) of the number of resource blocks of RACH message 3 previously transmitted in the Semi Persistent sub-frame #m. For example, calculation may be made by $RB_{RACHM3}=RB_{RACHM3,average} \times weight_{RACHM3}$. Herein, the $weight_{RACHM3}$ is a factor to adjust the degree to reserve resources for RACH message 3. For example, when the variation amount of resources for RACH message 3 is large and it is necessary to reserve extra resources for RACH message 3, $weight_{RACHM3}=2$ may be set. Meanwhile, for example, when the variation amount of resources for RACH message 3 is small and it is not necessary to reserve extra resources for RACH message 3, $weight_{RACHM3}=1$ may be set. By step S510, in the Semi Persistent sub-frame #m, the number of resource blocks allocated to RACH message 3 on average is counted as resource usage amount UL_Resource (m).

To the value of UL_Resource (m) is added a value of the number of resource blocks $RB_{PersistentUL}$ of uplink data to which resources are allocated by Semi Persistent scheduling (step S512). In addition, the uplink data includes both of newly transmitted data and retransmitted data. Alternately, instead of the uplink data including both of the newly transmitted data and retransmitted data, the $RB_{Persistent,UL}$ may be added assuming that the uplink data includes only the newly transmitted data. The number of resource blocks $RB_{PersistentUL}$ of uplink data to which resources are allocated by Semi Persistent scheduling is calculated based on the time average value ($RB_{Persistent,average,UL}$) of the number of resource blocks of uplink data to which resources are allocated by Semi Persistent scheduling previously transmitted in the Semi Persistent sub-frame #m. For example, calculation may be made by $RB_{Persistent,UL}=RB_{Persistent,average,UL} \times weight_{Persistent,UL}$. Herein, the $weight_{Persistent,UL}$ is a factor to adjust the degree to reserve resources for uplink data to which resources are allocated by Semi Persistent scheduling. For example, when the variation amount of resources for uplink data to which resources are allocated by Semi Persistent scheduling is large and it is necessary to reserve extra resources for uplink data to which resources are allocated by Semi Persistent scheduling, $weight_{Persistent,UL}=2$ may be set. Meanwhile, for example, when the variation amount of resources for uplink data to which resources are allocated by Semi Persistent scheduling is small and it is not necessary to reserve extra resources for uplink data to which resources are allocated by Semi Persistent scheduling, $\text{weight}_{Persistent,UL}=1$ may be set. By step S512, the number of resource blocks allocated to the uplink data to which resources are allocated by Semi Persistent scheduling is counted as resource usage amount UL_Resource (m) in the Semi Persistent sub-frame #m.

The resource usage amount concerning each sub-frame within the predetermined period is calculated by above-mentioned steps S504 to S512.

In addition, in the processing of above-mentioned steps S504 to S512, the resource usage amount concerning each sub-frame includes resource usage amounts allocated to the Random Access Channel, RACH Message 3 and Guard RB. As a substitute therefor, without including these resource usage amounts, the resource usage amount concerning each sub-frame includes only resource blocks allocated to the UL-SCH to which is applied Semi Persistent scheduling. Alternately, the resource usage amount concerning each sub-frame may include part of resource usage amounts allocated to the Random Access Channel, RACH Message 3 and Guard RB, and resource blocks allocated to the UL-SCH to which is applied Semi Persistent scheduling.

The DRX On-duration setting processing performed in the DRX On-duration setting processing section 204 will be described below with reference to FIG. 6.

In the mobile communication system, for the purpose of battery saving of the user equipment 100, DRX control (discontinuous reception control) is performed. DRX control is performed when a data mount to communicate does not exist or a data amount to communicate is a data amount that can be transmitted only by resources allocated by Semi Persistent scheduling. In DRX control, the base station apparatus 200 and user equipment 100 perform communications with each other while dividing the duration into the duration (On-duration, reception duration in the discontinuous reception) for receiving signals from the base station apparatus 200 and the duration (Off-duration, non-reception duration of the discontinuous reception) for not receiving signals from the base station apparatus 200. The user equipment 100 neither transmits uplink signals nor receives downlink signals during the Off-duration, and is thereby capable of reducing power consumption.

The DRX On-duration setting processing section 204 may set the On-duration of DRX of the user equipment 100 based on the resource amount calculated in the RB usage amount calculation processing section 202. For example, the DRX On-duration setting processing section 204 may set the On-duration of DRX so as to minimize the resource usage amount of Semi Persistent sub-frames included in the On-duration. As an example, the case will be described where the predetermined period is 20 ms, Semi Persistent sub-frames #0 to #19 are defined, and the resource usage amounts are respectively 2, 3, . . . , 2.5.

Herein, when the length of On-duration is 2 ms (two sub-frames), On-duration such that the resource usage amount of Semi Persistent sub-frames included in the On-duration is minimized is Semi Persistent sub-frames #0 and #1. In this case, the DRX On-duration setting processing section 204 sets Semi Persistent sub-frames #0 and #1 as the On-duration of DRX of the user equipment 100. In the Semi Persistent sub-frames set as the On-duration of DRX for some user equipment 100, transmission of uplink data is performed using uplink radio resources assigned to the user equipment by Semi Persistent scheduling, and therefore, the resource usage amount increases. Accordingly, when the processing for setting On-duration of DRX is performed sequentially on user equipments 100 in the cell so as to minimize the resource usage amount of Semi Persistent sub-frames included in the On-duration, as the result, the On-duration of DRX is set so as to equalize the resource usage amount of each Semi Persistent sub-frame. Herein, the equalized resource usage amount of each Semi Persistent sub-frame means that the resource assignment is performed efficiently.

Figure 7:
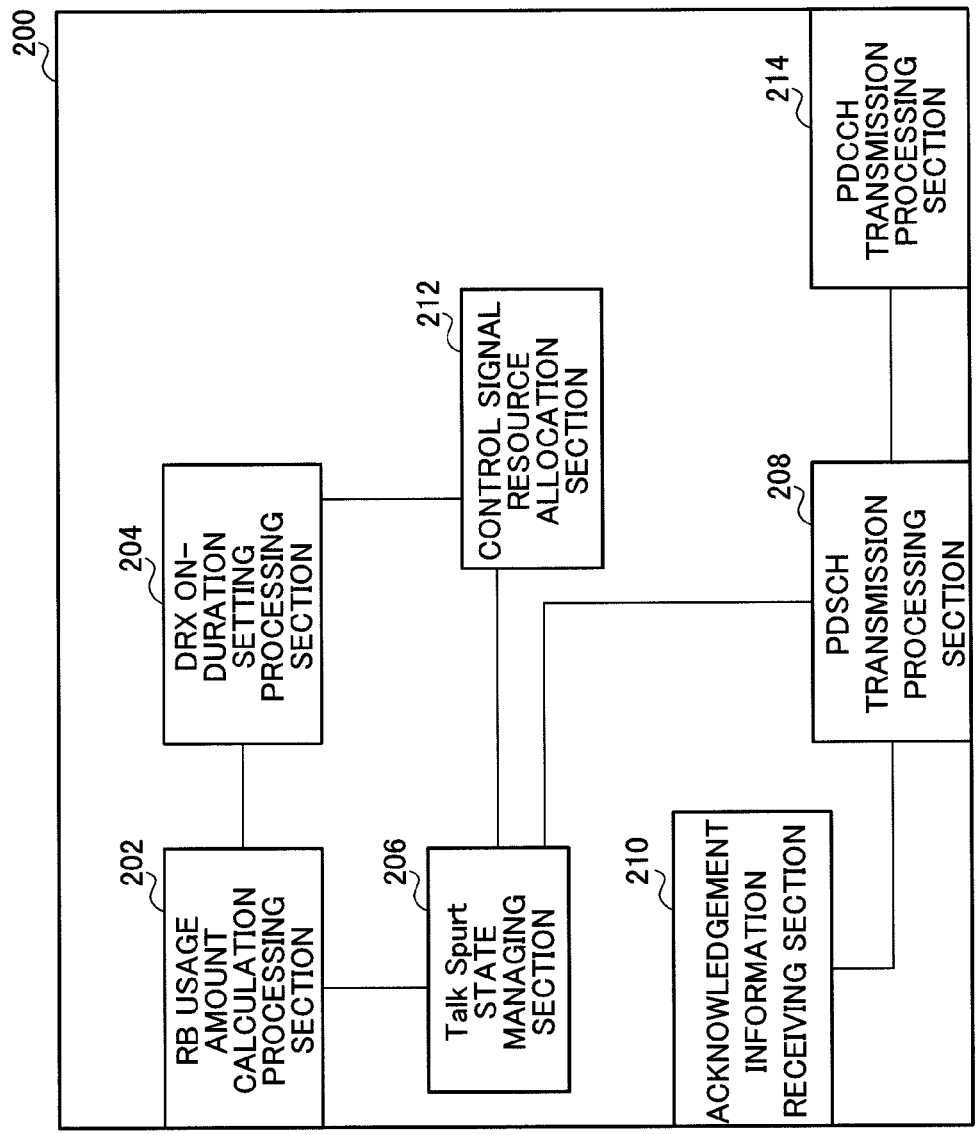
FIG. 7 is a partial block diagram concerning downlink illustrating the base station apparatus according to an Embodiment.

The downlink will be described below with reference to FIG. 7. The base station apparatus 200 according to this Embodiment assigns downlink radio resources to the user equipment 100 in a fixed manner at predetermined intervals, starting at the assignment start time as a starting point. Further, the base station apparatus 200 transmits downlink data using the downlink radio resources.

The base station apparatus 200 according to this Embodiment has the RB usage amount calculation processing section 202, DRX On-duration setting processing section 204, Talk Spurt state managing section 206, PDSCH transmission processing section 208, acknowledgement information reception processing section 210, control signal resource allocation section 212, and PDCCH transmission processing section 214.

The RB usage amount calculation processing section 202 calculates a usage amount of resources concerning sub-frames within a transmission cycle in Semi Persistent Scheduling. The transmission cycle may be a predetermined cycle. The sub-frame may be also referred to as a time frame. Herein, the resources include frequency resources. The resource usage amount includes the amount or the number of resource blocks. For example, in the LTE system, one resource block is 180 KHz. Further, one sub-frame is 1 ms. For example, when the predetermined cycle is 20 ms, the RB usage amount calculation processing section 202 calculates a resource usage amount on each sub-frame of 20 sub-frames.

The DRX On-duration setting processing section 204 sets the reception duration on each user equipment 100 undergoing discontinuous reception (DRX: Discontinuous transmission) control inside the cell. The reception duration is the On-duration of the DRX state. For example, the DRX On-duration setting processing section 204 sets the DRX On-duration based on the resource usage amount calculated in the RB usage amount calculation processing section 202. For example, the DRX On-duration setting processing section 204 may set the DRX On-duration so as to minimize the total resource usage amount within the set DRX On-duration.

Alternately, instead of setting the DRX On-duration based on the resource usage amount, the DRX On-duration setting processing section 204 may set the DRX On-duration based on the number of user equipments under the DRX On-duration per each sub-frame. More specifically, the section 204 may set the DRX On-duration so as to minimize "the number of user equipments under the DRX On-duration" within the DRX On-duration. Alternately, the section 204 may set the DRX On-duration based on the number of user equipments at the starting point of the DRX On-duration per each sub-frame. More specifically, the section 204 may set the DRX On-duration so that the sub-frame such that "the number of user equipments at the starting point of the DRX On-duration" is the lowest is the starting point of the DRX On-duration.

By setting the DRX On-duration as described above, it is possible to smooth the resource usage amount of each sub-frame.

In addition, in the above-mentioned processing, the DRX On-duration is set so as to smooth the resource usage amount of each sub-frame, and as a substitute therefor, the DRX On-duration may be set using other algorithms.

The Talk Spurt state managing section 206 manages the Talk Spurt state of each UE in the cell i.e. whether or not to perform resource allocation by Semi Persistent Scheduling. Herein, in the resource allocation in Semi Persistent Scheduling, downlink data is transmitted using downlink radio resources allocated in a fixed manner at predetermined intervals from the allocation starting time as the starting point. The downlink radio resources include the PDSCH.

The PDSCH transmission processing section 208 transmits the downlink data, using downlink radio resources allocated, to the user equipment 100 such that the Talk Spur state is ON, in a fixed manner at predetermined intervals from the assignment starting time as a starting point. The downlink radio resources include the PDSCH.

The acknowledgement information reception processing section 210 receives the acknowledgement information for the downlink radio resources. The downlink radio resources include the PDSCH.

Figure 3B:
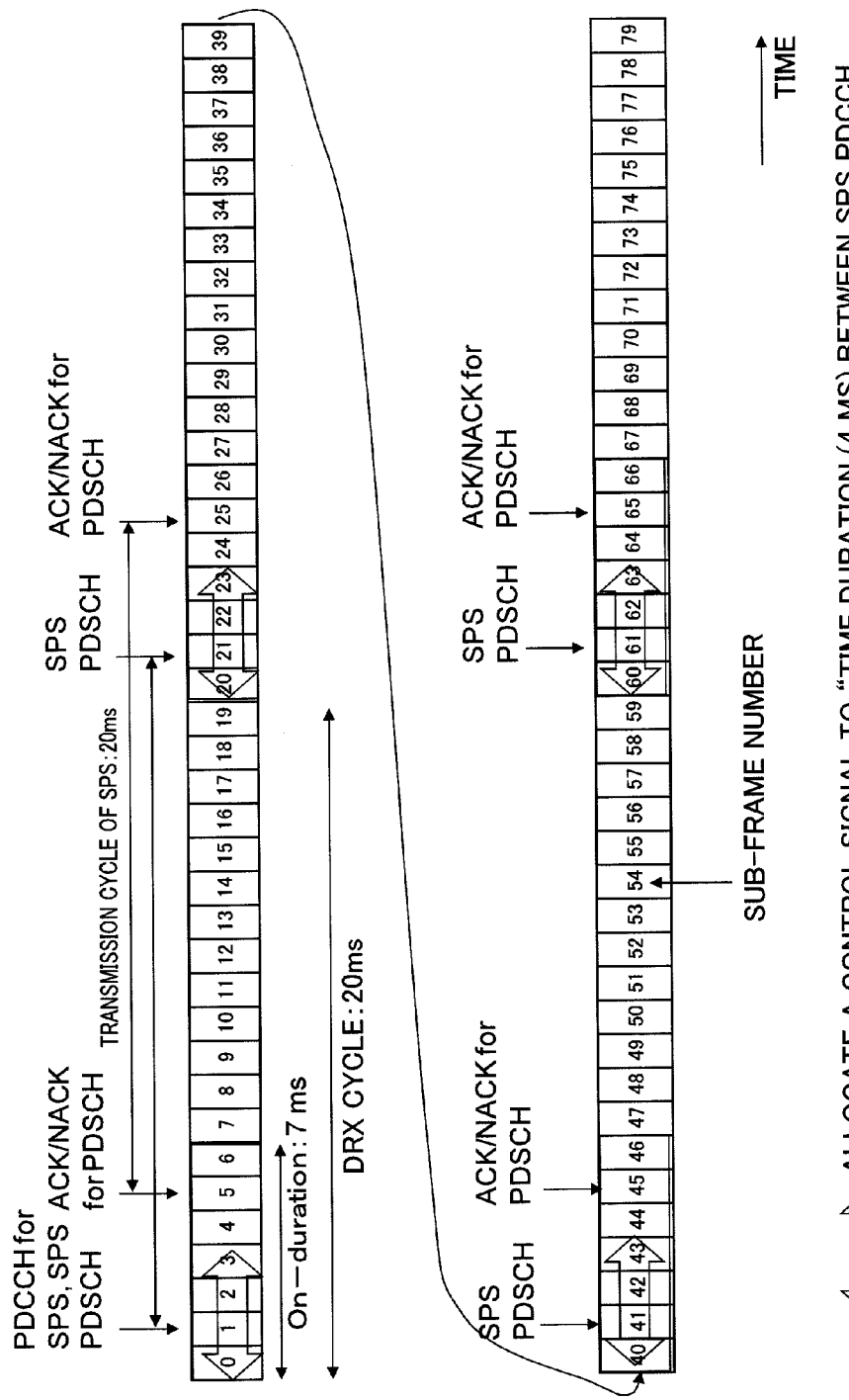
FIG. 3B is an explanatory view illustrating an allocation range of an uplink control signal and transmission timing of acknowledgment information for downlink radio resources (PDSCH) in DRX On-duration.

The control signal resource allocation section 212 allocates radio resources for an uplink control signal for the user equipment 100 to transmit during the On-duration of the DRX state to within the predetermined time duration (hereinafter, referred to as a first predetermined period) from the beginning of the On-duration of the DRX state. The uplink control signal may be at least one of the downlink radio quality information, and scheduling request. Particularly, for the user equipment to which is applied Semi Persistent Scheduling, it is desirable to allocate to within the predetermined time duration (first predetermined period) from the beginning of the On-duration of the DRX state in which the acknowledgement information for a data signal in downlink is not transmitted. More specifically, as shown in FIG. 3B, the control signal resource allocation section 212 allocates radio resources for an uplink control signal to a sub-frame within the predetermined time duration (first predetermined period) from the beginning of the On-duration of DRX control. In an example as shown in FIG. 3B, the DRX cycle and the transmission cycle of SPS are 20 ms, and the length of the On-duration is 7 ms. With respect to DRX control, sub-frames with sub-frame numbers of "n×20~n×20+6 (in addition, n is an integer)" are set for On-duration. Further, in SPS, the downlink scheduling information for SPS is transmitted in sub-frame number 1 from the base station apparatus to the user equipment, and downlink radio resources (PDSCH) are allocated to the user equipment in a fixed manner at 20 ms-intervals from the sub-frame (sub-frame number 1). In this case, the acknowledgement information for the downlink radio resources (PDSCH) is transmitted in a sub-frame four sub-frames after the sub-frame in which the downlink radio resources (PDSCH) are transmitted. In other words, the acknowledgement information for the downlink radio resources (PDSCH) is transmitted to the user equipment at 20-ms intervals from sub-frame number 5.

Herein, from the viewpoint of ensuring flexibility of time resources, the downlink scheduling information (PDCCH) for SPS is capable of being transmitted at any timing (sub-frame number=n×20~n×20+6) within the On-duration of the DRX state. When the downlink scheduling information for SPS is transmitted in sub-frame number 0 that is the beginning of the On-duration of DRX control, the acknowledgement information for downlink radio resources (PDSCH) is transmitted to the user equipment in a fixed manner at 20 ms-intervals from sub-frame number 4 four sub-frames after the sub-frame. In other words, the acknowledgement information for downlink radio resources (PDSCH) is not transmitted during the first predetermined period (four sub-frames in SPS exemplified in FIG. 3B) from the beginning of the On-duration of DRX control. Accordingly, when radio resources for an uplink control signal are allocated to the first predetermined period (four sub-frames in SPS exemplified in FIG. 3B) from the beginning of the On-duration of DRX control, it is possible to ensure flexibility of time resources allocated to the PDCCH, and reliably avoid a collision between transmission timing of an uplink control signal and transmission timing of acknowledgement information for a downlink data signal by SPS.

In addition, in the above-mentioned example, the control signal resource allocation section 212 allocates radio resources for an uplink control signal to the first predetermined period (four sub-frames in SPS exemplified in FIG. 3B) from the beginning of the On-duration of DRX control, and as a substitute therefor, may allocate radio resources for an uplink control signal to the time duration except a second predetermined period from the beginning of the On-duration of DRX control within the first predetermined period from the beginning of the On-duration of DRX control. For example, two sub-frames from the beginning may be set for the second predetermined period within the above-mentioned first predetermined period (four sub-frames). In this case, in the example of FIG. 3B, the radio resources for an uplink control signal are allocated in sub-frame numbers 2+20n or 3+20×n. In other words, the sub-frames of the second predetermined period from the first sub-frame within the On-duration of DRX control are omitted from candidates to which the radio resources for an uplink control signal are allocated.

Herein, described below is the effect of omitting the sub-frames of the second predetermined period from the first sub-frame within the On-duration of DRX control from candidates to which the radio resources for an uplink control signal are allocated.

For example, the CQI is downlink radio quality information that is calculated in the user equipment 100 based on the downlink reference signal DL RS or the like. Accordingly, the user equipment 100 needs to perform the calculation processing of CQI in a sub-frame before a sub-frame to transmit the CQI. In this case, for example, when uplink radio resources for the CQI are allocated to the beginning of the On-duration, the user equipment 100 needs to perform the calculation processing of CQI in a sub-frame before the On-duration. This means that the effect of battery saving by DRX control as described previously is reduced. Accordingly, as described above, by omitting the sub-frames of the second predetermined period from the first sub-frame within the On-duration of DRX control from candidates to which the radio resources for an uplink control signal are allocated, it is possible to maintain the battery saving effect of the user equipment.

In addition, the second predetermined period may be determined based on the measurement interval of CQI in the user equipment 100. For example, when the measurement interval of CQI is 2 ms, the second predetermined period may be set at 2 ms. In other words, the user equipment 100 may measure or calculate the CQI during the second predetermined period.

In addition, the above-mentioned processing of omitting the second predetermined period within the first predetermined period from candidates to which radio resources for an uplink control signal are allocated may be applied only to the CQI without being applied to the scheduling request. In other words, whether or not to define the second predetermined period may be based on the type of control signal.

The control signal resource allocation section 212 notifies the user equipment 100 of the radio resources for an uplink control signal allocated by the above-mentioned processing. For example, the information on the radio resources for an uplink control signal may be notified to the user equipment 100 as part of the control information included in RRC Message. In this case, the user equipment 100 transmits the uplink control signal (CQI and scheduling request) using the notified radio resources for the uplink control signal.

In addition, as well as the control signal of CQI, scheduling request, etc., also with respect to a sounding reference signal, the control signal resource allocation section 212 may allocate the radio resources to within the predetermined time interval (first predetermined period) from the beginning of the On-duration of the DRX state. In other words, more specifically, as shown in FIG. 3B, the control signal resource allocation section 212 may allocate the radio resources for a sounding reference signal to a sub-frame within the predetermined duration (first predetermined period, 4 ms in FIG. 3B) from the beginning of the On-duration of DRX control.

Described below is the effect of allocating the radio resources also for a sounding reference signal to within the predetermined time duration (first predetermined period) from the beginning of the On-duration of the DRX state.

In the LTE system, when a sounding reference signal and the acknowledgement information for a downlink data signal by SPS is transmitted in the same sub-frame, the operation is performed for only transmitting the acknowledgement information without transmitting the sounding reference signal, or for transmitting the sounding reference signal in an SC-FDMA symbol to transmit the sounding reference signal and transmitting only the acknowledgement information in an SC-FDMA symbol not to transmit the sounding reference signal. One of the two operations is selected by signaling in the RRC layer. Herein, when the former operation is selected, since the sounding reference signal is not transmitted always, it becomes difficult to perform appropriate control on the uplink transmission power control and AMC control, and the problem arises. Meanwhile, when the latter operation is selected, the sounding reference signal is transmitted, but since the acknowledgement information is not transmitted in the SC-FDMA symbol to transmit the sounding reference signal, as a result, the problem arises that transmission characteristics of the acknowledgement information deteriorate. Conversely, by allocating radio resources for a sounding reference signal to within the predetermined time interval (first predetermined period) from the beginning of the On-duration of the DRX state, it is possible to avoid transmission of the sounding reference signal and the acknowledgement information for a downlink data signal by SPS in the same sub-frame, and as a result, it is possible to prevent the above-mentioned problems from occurring.

In addition, also with respect to the sounding reference signal, the processing may be performed for allocating the radio resources to the time duration except the second predetermined period from the beginning of the On-duration of DRX control within the first predetermined period from the beginning of the On-duration of DRX control.

Further, also with respect to the sounding reference signal, the information on the radio resources may be notified to the user equipment 100 as part of the control information included in RRC Message.

The PDCCH transmission processing section 214 transmits the downlink scheduling information to the user equipment, when it is determined that resources for initial transmission for Semi Persistent Scheduling is notified. The downlink scheduling information includes an allocation signal in a fixed manner. The downlink scheduling information is mapped to the PUCCH.

Figure 8:
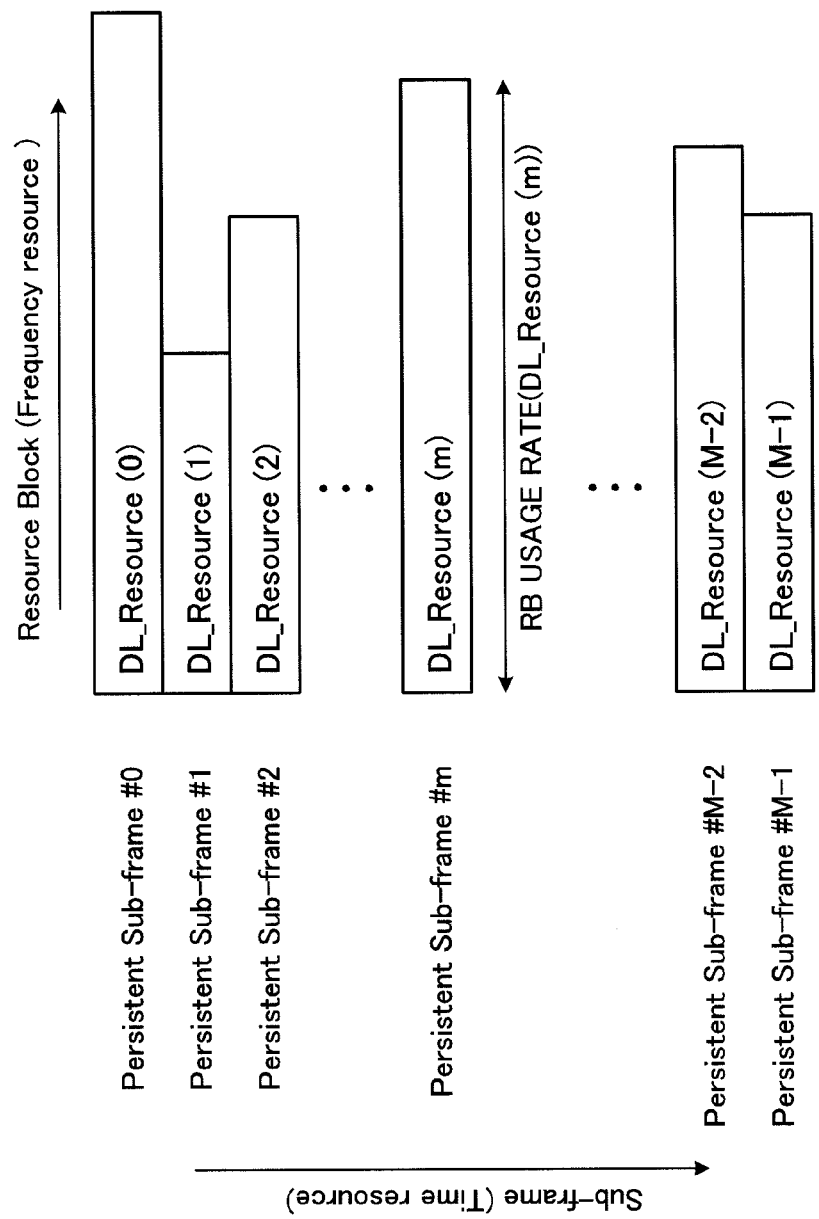
FIG. 8 is an explanatory view illustrating processing for calculating a resource block usage amount in the base station apparatus according to an Embodiment.

The processing for calculating a resource block usage amount performed in the RB usage amount calculation processing section 202 will specifically be described below with reference to FIG. 8.

A sub-frame within a predetermined period is defined as a Semi Persistent sub-frame. The RB usage amount calculation processing section 202 calculates a resource usage amount for each Semi Persistent sub-frame. In FIG. 8, the resource usage amount is shown by UL_Resource (m) (m is 0 or an integer of 0<m). In FIG. 8, m represents an index of the Semi Persistent sub-frame. In FIG. 8, M represents the total number of Semi Persistent sub-frames i.e. represents the total number of sub-frames included in the predetermined period.

The resource usage amount DL_Resource (m) for each Semi Persistent sub-frame corresponds to the number of resource blocks (RB) allocated to a synchronization signal (SCH: Synchronization Channel)/Physical-Broadcast channel (P-BCH), Dynamic-Broadcast Channel (D-BCH), Paging Channel (PCH), random access channel response (RACH response), MBMS (Multimedia Broadcast Multicast Service), and the DL-SCH to which is applied Semi Persistent scheduling in Semi Persistent sub-frame #m.

Figure 9:
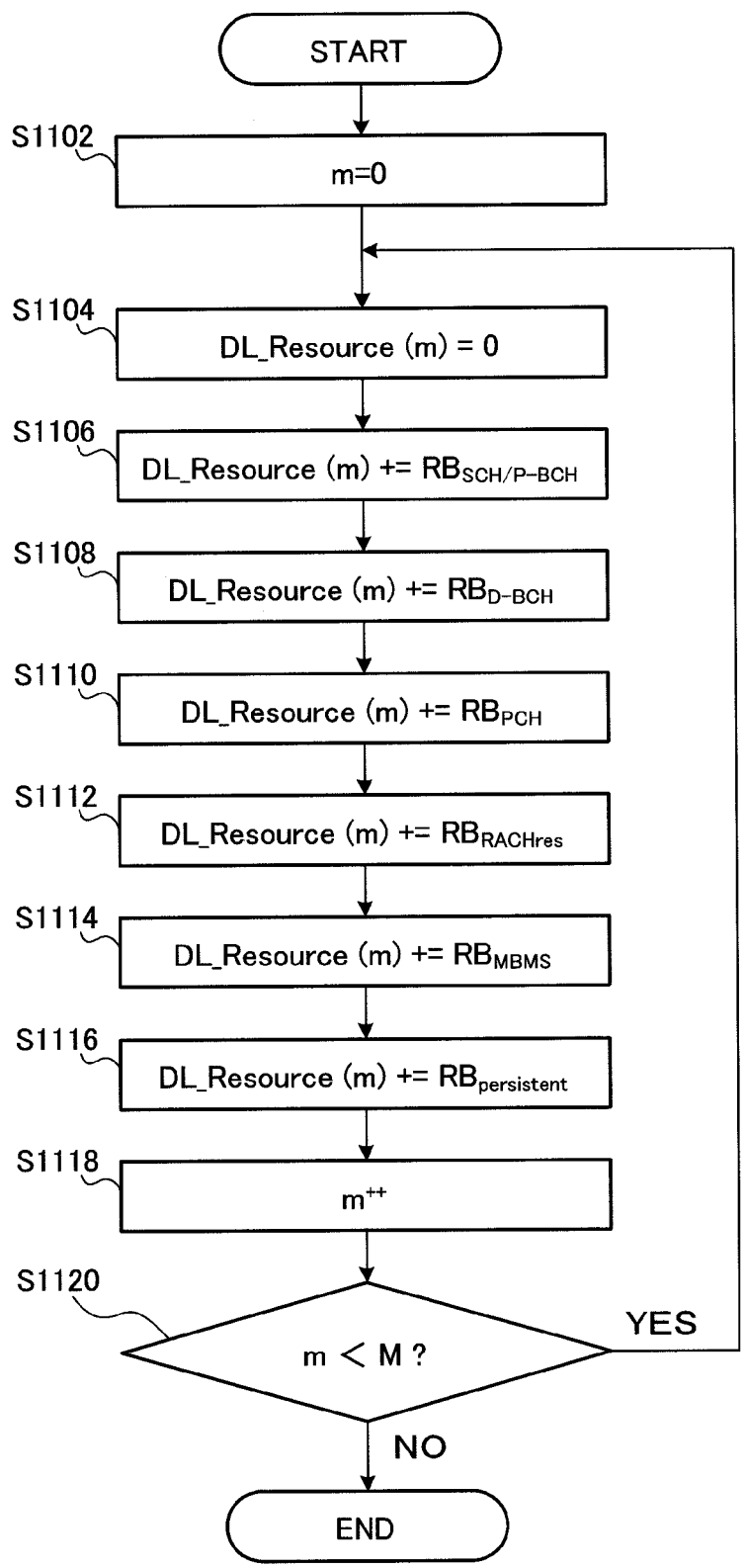
FIG. 9 is a flow diagram illustrating the processing for calculating a resource block usage amount in the base station apparatus according to an Embodiment.

The processing flow in the RB usage amount calculation processing section 202 will be described with reference to FIG. 9. The index of the Semi Persistent sub-frame is set at "0" (step S1102).

The value of DL_Resource (m) in Semi Persistent sub-frame #m is initialized (step S1104).

To DL_Resource (m) is added resource block $RB_{SCH/P-BCH}$ used in the synchronization signal and Physical-Broadcast Channel (step S1106). The resource block $RB_{SCH/P-BCH}$ used in the synchronization signal and Physical-Broadcast Channel is calculated based on whether or not the synchronization signal and Physical-Broadcast Channel are transmitted in the Semi Persistent sub-frame #m. For example, when the synchronization signal and Physical-Broadcast Channel are transmitted in the Semi Persistent sub-frame #m, $RB_{SCH/P-BCH}$ is set at "6". When the synchronization signal and Physical-Broadcast Channel PRACH are not transmitted in the Semi Persistent sub-frame #m, $RB_{SCH/P-BCH}$ is set at "0". Further, for example, when the synchronization signal and Physical-Broadcast Channel PRACH are transmitted in the Semi Persistent sub-frame #m, $RB_{SCH/P-BCH}$ may be set at "7".

To DL_Resource (m) is added resource block $RB_{D-BCH}$ used in the Dynamic-Broadcast Channel (step S1108). The resource block $RD_{D-BCH}$ used in the Dynamic-Broadcast Channel is calculated based on whether or not the Dynamic-Broadcast Channel is transmitted in the Semi Persistent sub-frame #m. For example, when the Dynamic-Broadcast Channel is transmitted in the Semi Persistent sub-frame #m, it is set that $RB_{D-BCH}=RB_{S1} \times Weight_{S1}+RB_{S2} \times Weight_{S2}+\ldots$ When the Dynamic-Broadcast Channel is not transmitted in the Semi Persistent sub-frame #m, $RB_{D-BCH}$ is set at "0". Herein, S1, S2, . . . are indexes indicating types of Dynamic-Broadcast channels. $RB_{S1}$ and $RB_{S2}$ are respectively the numbers of resource blocks allocated to Dynamic-Broadcast Channel S1 and Dynamic-Broadcast Channel S2. Further, the $Weight_{S1}$ and $Weight_{S2}$ are weighting factors. In step S1108, the number of resource blocks is counted with respect to all the Dynamic-Broadcast Channels having the possibility of being transmitted in the Semi Persistent sub-frame #m. Meanwhile, there is the case that the transmission cycle of the Dynamic-Broadcast Channel is longer than the above-mentioned predetermined period. In this case, there are cases that the Dynamic-Broadcast Channel is transmitted or not transmitted in some Semi Persistent sub-frame #m. By using the weighting factors, it is possible to adjust the effect of the transmission cycle of the Dynamic-Broadcast Channel on the resource usage amount. For example, when the predetermined period is 20 ms and transmission cycle of the D-BCH is 80 ms, the weighting factor may be Weight=$^{20}/_{80}$=0.25. Further, when the predetermined period is 20 ms and transmission cycle of the D-BCH is 80 ms, the weighting factor may be Weight=1.0.

To DL_Resource (m) is added resource block $RB_{RCH}$ used in the Paging Channel (step S1110). The resource block $RB_{RCH}$ used in the Paging Channel is calculated based on the time average value ($RB_{PCH,average}$) of the number of resource blocks of the Paging Channel previously transmitted in the Semi Persistent sub-frame #m. For example, calculation may be made by $RB_{PCH}=RB_{PCH,average}\times weight_{PCH}$. Herein, the $weight_{PCH}$ is a factor to adjust the degree to reserve resources for the PCH. For example, when the variation amount of resources for the PCH is large and it is necessary to reserve extra resources for the PCH, $weight_{PCH}=2$ may be set. Meanwhile, for example, when the variation amount of resources for the PCH is small and it is not necessary to reserve extra resources for the PCH, $weight_{PCH}=1$ may be set. By step S1110, in the Semi Persistent sub-frame #m, the number of resource blocks allocated on average to the PCH is counted as resource usage amount DL_Resource (m).

To DL_Resource (m) is added resource block $RB_{RACHres}$ used in an RACH response (step S1112). The resource block $RB_{RACHres}$ used in the RACH response is calculated based on the time average value ($RB_{RACHres,average}$) of the number of resource blocks of the RACH response previously transmitted in the Semi Persistent sub-frame #m. For example, calculation may be made by $RB_{RACHRes}=RB_{RACHres,average}\times weight_{RACHres}$. Herein, the $weight_{RACHres}$ is a factor to adjust the degree to reserve resources for the RACH response. For example, when the variation amount of resources for the RACH response is large and it is necessary to reserve extra resources for the RACH response, $weight_{RACHres}=2$ may be set. Meanwhile, for example, when the variation amount of resources for the RACH response is small and it is not necessary to reserve extra resources for the RACH response, $weight_{RACHres}=1$ may be set. By step S1112, in the Semi Persistent sub-frame #m, the number of resource blocks allocated on average to the RACH response is counted as resource usage amount DL_Resource (m).

To DL_Resource (m) is added resource block $RB_{MBMS}$ used in MBMS (step S1114). The resource block $RB_{MBMS}$ used in MBMS is calculated based on whether or not the MBMS is transmitted in the Semi Persistent sub-frame #m. For example, when the MBMS is transmitted in the Semi Persistent sub-frame #m, calculation may be made by $RB_{MBMS,tmp}=RB_{MBMS}\times Weight_{MBMS}$. When the MBMS is not transmitted in the Semi Persistent sub-frame #m, $RB_{MBMS,tmp}$ is set at "0". Herein, the $Weight_{MBMS,tmp}$ is a weighting factor to correct the effect of the transmission cycle of MBMS. By step S1114, in the Semi Persistent sub-frame #m, in the case of transmitting the MBMS, the number of resource blocks allocated to the MBMS is counted as resource usage amount DL_Resource (m).

To DL_Resource (m) is added resource block $RB_{Persistent,DL}$ allocated to the downlink by Semi Persistent scheduling (step S1116). The resource block $RB_{Persistent,DL}$ allocated to the downlink by Semi Persistent scheduling is calculated based on the time average value ($RB_{Persistent,average,DL}$) of the number of resource blocks of the downlink data to which resources are allocated by Semi Persistent scheduling previously transmitted in the Semi Persistent sub-frame #m. For example, calculation may be made by $RB_{Persistent,DL}=RB_{Persistent,average,DL}\times weight_{Persistent,DL}$. Actually, also with respect to the downlink data for which the allocation of resources has been made by Dynamic scheduling, when the downlink data scheduled to undergo the allocation of resources by Semi Persistent scheduling is included, the calculation may be performed assuming the number of resource blocks to be the number of resource blocks of the downlink data to which resources are allocated by Semi Persistent scheduling. Herein, the downlink data includes both the newly transmitted data and retransmitted data. In addition, instead of the downlink data including both the newly transmitted data and retransmitted data, the $RB_{Persistent,DL}$ may be calculated assuming that the downlink data includes only the newly transmitted data.

When a plurality of items of downlink data to which resources are allocated by Semi Persistent scheduling is transmitted in the Semi Persistent sub-frame #m, the total number of resource blocks of a plurality of items of downlink data to which resources are allocated by Semi Persistent scheduling is assumed to be the number of resource blocks of the downlink data to which resources are allocated by Semi Persistent scheduling.

The weighting factor $weight_{Persistent,DL}$ is a factor to adjust the degree to reserve resources of the downlink data to which resources are allocated by Semi Persistent scheduling. For example, when the variation amount of resources for downlink data to which resources are allocated by Semi Persistent scheduling is large and it is necessary to reserve extra resources for downlink data to which resources are allocated by Semi Persistent scheduling, $weight_{Persistent,DL}=2$ may be set. Meanwhile, for example, when the variation amount of resources for uplink data to which resources are allocated by Semi Persistent scheduling is small and it is necessary to reserve extra resources for uplink data to which resources are allocated by Semi Persistent scheduling, $weight_{Persistent,DL}=1$ may be set. By step S1116, the number of resource blocks allocated to the downlink data to which resources are allocated by Semi Persistent scheduling in the Semi Persistent sub-frame #m is counted as resource usage amount DL_Resource (m).

The resource usage amount concerning each sub-frame within the predetermined period is calculated by the processing of above-mentioned steps S1104 to S1116.

In addition, in the processing of above-mentioned steps S1104 to S1116, the resource usage amount concerning each sub-frame includes resource usage amounts allocated to the synchronization signal and Physical-Broadcast Channel, Dynamic-Broadcast Channel, Paging Channel, random access response channel and MBMS. As a substitute therefor, without including these resource usage amounts, the resource usage amount concerning each sub-frame includes only resource blocks allocated to the DL-SCH to which is applied Semi Persistent scheduling. Alternately, the resource usage amount concerning each sub-frame may include part of resource usage amounts allocated to the synchronization signal and Physical-Broadcast Channel, Dynamic-Broadcast Channel, Paging Channel, random access response channel and MBMS, and resource blocks allocated to the DL-SCH to which is applied Semi Persistent scheduling.

The DRX On-duration setting processing performed in the DRX On-duration setting processing section 204 will be described below with reference to FIG. 10.

In the mobile communication system, for the purpose of battery saving of the user equipment 100, DRX control (discontinuous reception control) is performed. DRX control is performed when a data mount to communicate does not exist or a data amount to communicate is a data amount that can be transmitted only by resources allocated by Semi Persistent scheduling. In DRX control, the base station apparatus 200 and user equipment apparatus 100 perform communications with each other while dividing the duration into the duration (On-duration, reception duration of the discontinuous reception) for receiving signals from the base station apparatus 200 and the duration (Off-duration, non-reception duration of the discontinuous reception) for not receiving signals from the base station apparatus 200. The user equipment 100 neither transmits uplink signals nor receives downlink signals during the Off-duration, and is thereby capable of reducing power consumption.

The DRX On-duration setting processing section 204 may set the On-duration of DRX of the user equipment 100 based on the resource amount calculated in the RB usage amount calculation processing section 202. For example, the DRX On-duration setting processing section 204 may set the On-duration of DRX so as to minimize the resource usage amount of Semi Persistent sub-frames included in the On-duration. As an example, the case will be described where the predetermined period is 20 ms, Semi Persistent sub-frames #0 to #19 are defined, and the resource usage amounts are respectively 2, 3, . . . , 2.5.

Herein, when the length of On-duration is 2 ms (two sub-frames), On-duration such that the resource usage amount of Semi Persistent sub-frames included in the On-duration is minimized is Semi Persistent sub-frames #0 and #1. In this case, the DRX On-duration setting processing section 204 sets Semi Persistent sub-frames #0 and #1 as the On-duration of DRX of the user equipment 100. In the Semi Persistent sub-frames set as the On-duration of DRX for some user equipment 100, transmission of downlink data is performed using downlink radio resources assigned to the user equipment by Semi Persistent scheduling, and therefore, the resource usage amount increases. Accordingly, when the processing for setting On-duration of DRX is performed sequentially on user equipments 100 in the cell so as to minimize the resource usage amount of Semi Persistent sub-frames included in the On-duration, as the result, the On-duration of DRX is set so as to equalize the resource usage amount of each Semi Persistent sub-frame. Herein, the equalized resource usage amount of each Semi Persistent sub-frame means that the resource assignment is performed efficiently.

Figure 11:
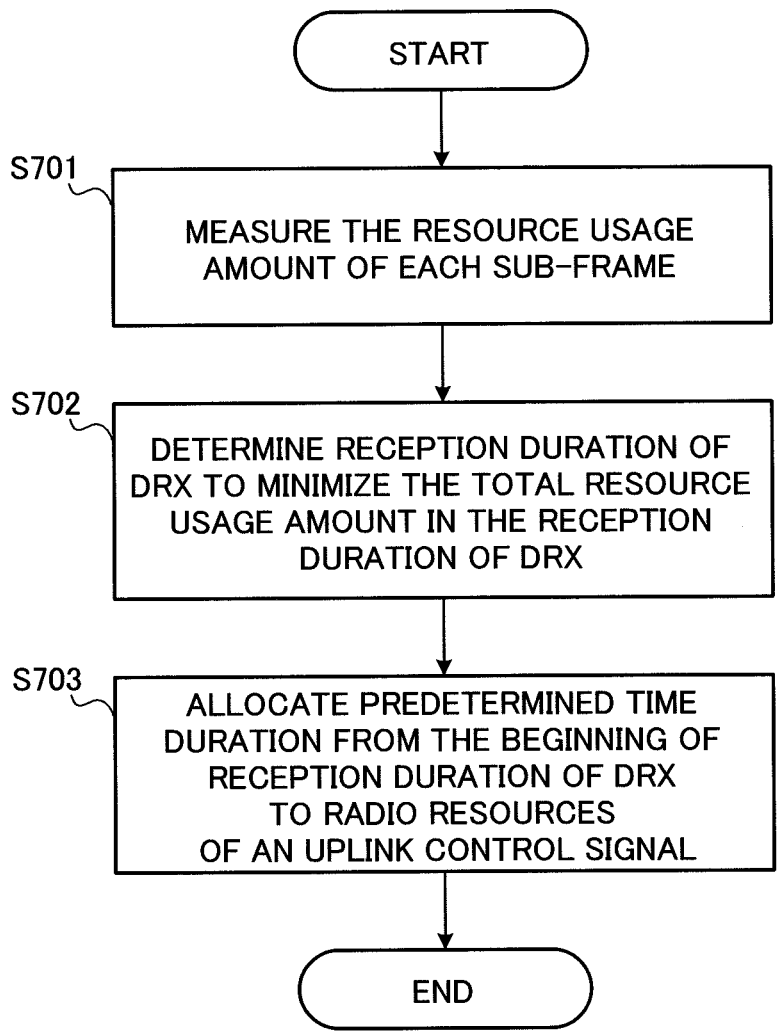
FIG. 11 is an explanatory view illustrating the operation of the base station apparatus according to an Embodiment.
Figure 12:
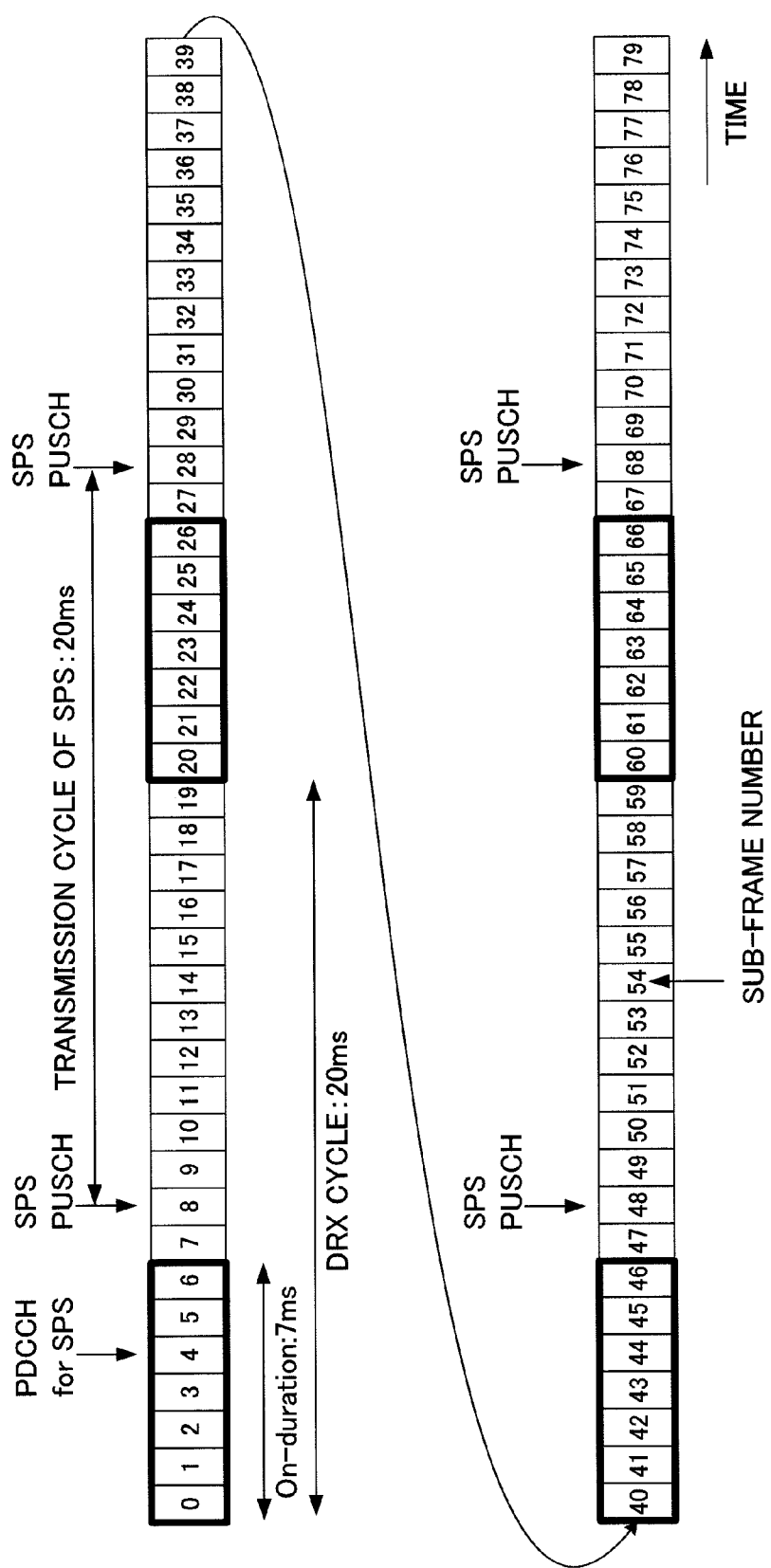
FIG. 12 is an image diagram of SPS and DRX control.
Figure 13:
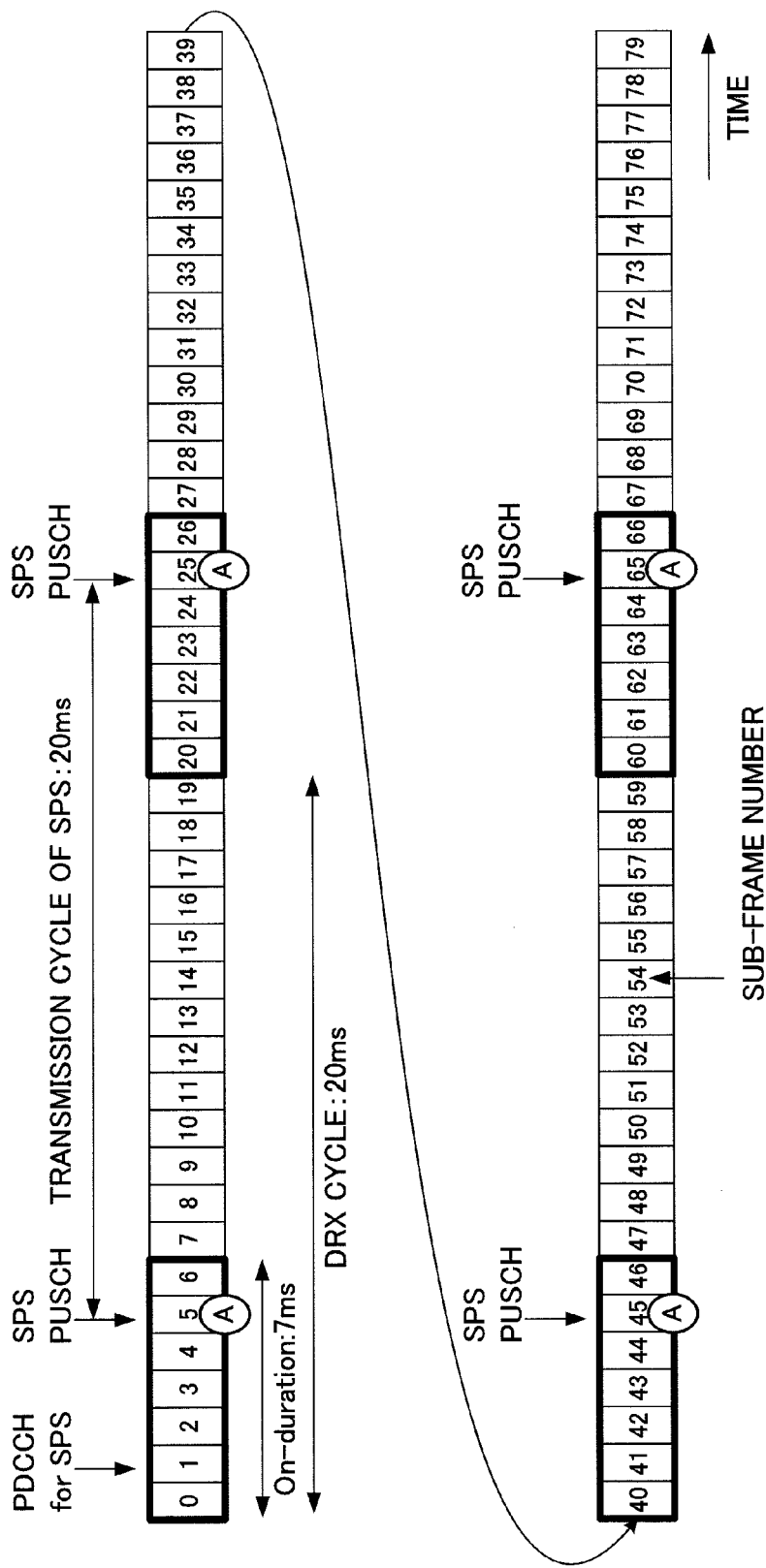
FIG. 13 is an image diagram in which a control signal of CQI, scheduling request, etc. is multiplexed onto the uplink shared channel (UL-SCH).

The operation of the base station apparatus 200 according to this Embodiment will be described with reference to FIG. 11. The base station apparatus 200 measures the resource usage amount of each sub-frame (step S701). For example, the RB usage amount calculation measuring section 204 measures the resource usage amount of each sub-frame as described above.

The base station apparatus 200 determines the reception duration of DRX control so as to minimize the total resource usage amount in the reception duration of DRX. For example, the DRX On-duration setting processing section 204 determines the DRX reception duration for the user equipment on which the determination to perform DRX control is made so as to minimize the total resource usage amount in the DRX reception duration (step S702).

The base station apparatus 200 allocates radio resources for an uplink control signal of CQI, scheduling request, etc. to the predetermined time duration (time duration (4 ms) between the PDCCH for SPS and SPS PUSCH in FIG. 3A) from the beginning of the reception duration of DRX control (step S703). In addition, as well as the CQI, scheduling request, etc., also with respect to a sounding reference signal, the base station apparatus 200 may allocate radio resources to the predetermined time duration (time duration (4 ms) between the PDCCH for SPS and SPS PUSCH in FIG. 3A) from the beginning of the reception duration of DRX control.

In the Embodiment as described above, the DRX On-duration setting processing section 204 may set the DRX On-duration based on uplink and downlink resource usage amounts. In this case, the RB usage amount calculation processing section 202 may calculate uplink and downlink usage amounts. Alternately, the DRX On-duration setting processing section 204 may set the DRX On-duration based on the number of user equipments under the DRX On-duration per each sub-frame.

The above-mentioned Embodiment describes the uplink and downlink separately, but a single base station apparatus may have both of the functions. In this case, the base station apparatus has the function of the base station apparatus described with reference to FIG. 2 and the function of the base station apparatus described with reference to FIG. 7.

In addition, in the above-mentioned examples, the case is shown where the time duration in uplink between reception timing of the uplink scheduling grant and transmission timing of the uplink shared channel is the same as the time duration in downlink between reception timing of the downlink scheduling information and transmission timing of the acknowledgement information for the downlink shared channel, and as a substitute therefor, the same processing is applicable to the case where the time duration in uplink between reception timing of the uplink scheduling grant and transmission timing of the uplink shared channel differs from the time duration in downlink between reception timing of the downlink scheduling information and transmission timing of the acknowledgement information for the downlink shared channel. In this case, for example, the above-mentioned resource allocation for an uplink control signal may be performed based on the shorter time duration between the time duration in uplink between reception timing of the uplink scheduling grant and transmission timing of the uplink shared Channel, and the time duration in downlink between reception timing of the downlink scheduling information and transmission timing of the acknowledgement information for the downlink shared channel. Alternately, the above-mentioned resource allocation for an uplink control signal may be performed based on the longer time duration between the time duration in uplink between reception timing of the uplink scheduling grant and transmission timing of the uplink shared Channel, and the time duration in downlink between reception timing of the downlink scheduling information and transmission timing of the acknowledgement information for the downlink shared channel.

According to the Embodiment, since radio resources for a first signal in uplink are allocated to within the predetermined time duration from the beginning of ON-duration of discontinuous reception, it is possible to avoid a collision between transmission timing of a data signal by SPS and transmission timing of an uplink control signal or sounding reference signal without impairing efficiency of the resource allocation in SPS and further without transmission characteristics deteriorating in the shared channel in uplink.

Moreover, according to the Embodiment, since radio resources for a first signal in uplink are allocated to within the predetermined time duration from the beginning of ON-duration of discontinuous reception, it is possible to avoid a collision between transmission timing of the acknowledgement information for a downlink data signal by SPS and transmission timing of an uplink control signal or sounding reference signal without impairing efficiency of the resource allocation in SPS and further without transmission characteristics deteriorating in the acknowledgement information for a downlink data signal.

The invention claimed is:

1. A base station apparatus comprising:
a setting section configured to set On-duration of discontinuous reception on a user equipment performing discontinuous reception control;
an allocating section configured to allocate radio resources for a first signal in uplink for the user equipment to transmit during the On-duration of discontinuous reception to within first predetermined time duration from the beginning of the ON-duration of discontinuous reception; and
wherein the first predetermined time duration to which are allocated the radio resources for the first signal in uplink is time duration between reception in downlink of a control signal to allocate radio resources for a second signal in uplink and transmission in uplink of the second signal in the user equipment.

2. The base station apparatus according to claim 1, wherein the setting section sets the On-duration of discontinuous reception based on a resource usage amount in each time frame.

3. The base station apparatus according to claim 1, wherein the setting section sets the On-duration of discontinuous reception so as to minimize the total resource usage amount of time frames within the On-duration of discontinuous reception.

4. The base station apparatus according to claim 1, wherein the setting section sets the On-duration of discontinuous reception so as to equalize the number of user equipments under time duration to measure reception quality per time frame.

5. The base station apparatus according to claim 1, wherein the setting section sets the On-duration of discontinuous reception based on a resource usage amount in each time frame.

6. The base station apparatus according to claim 1, wherein the first predetermined time duration to which the radio resources for the first signal in uplink are allocated is time duration between reception in downlink of a downlink data signal and transmission in uplink of acknowledgement information for the downlink data signal in the user equipment.

7. The base station apparatus according to claim 6, wherein the setting section sets the On-duration of discontinuous reception based on a resource usage amount in each time frame.

8. The base station apparatus according to claim 1, wherein the second signal in uplink is an uplink data signal.

9. The base station apparatus according to claim 8, wherein the setting section sets the On-duration of discontinuous reception based on a resource usage amount in each time frame.

10. The base station apparatus according to claim 1, wherein the allocating section allocates the radio resources for the first signal in uplink for the user equipment to transmit during the ON-duration of discontinuous reception to time duration except second time duration within the first predetermined time duration.

11. The base station apparatus according to claim 10, wherein the second time duration is determined based on time duration required to calculate the first signal in uplink.

12. The base station apparatus according to claim 10, wherein the setting section sets the On-duration of discontinuous reception based on a resource usage amount in each time frame.

13. The base station apparatus according to claim 11, wherein the setting section sets the On-duration of discontinuous reception based on a resource usage amount in each time frame.

14. The base station apparatus according to claim 1, wherein the first signal in uplink is at least one of radio quality information of downlink, scheduling request and a sounding reference signal.

15. The base station apparatus according to claim 14, wherein the setting section sets the On-duration of discontinuous reception based on a resource usage amount in each time frame.

16. The base station apparatus according to claim 14, wherein the setting section sets the On-duration of discontinuous reception based on a resource usage amount in each time frame.

17. The base station apparatus according to claim 14, wherein the first predetermined time duration to which the radio resources for the first signal in uplink are allocated is time duration between reception in downlink of a downlink data signal and transmission in uplink of acknowledgement information for the downlink data signal in the user equipment.

18. The base station apparatus according to claim 17, wherein the setting section sets the On-duration of discontinuous reception based on a resource usage amount in each time frame.

19. The base station apparatus according to claim 14, wherein the allocating section allocates the radio resources for the first signal in uplink for the user equipment to transmit during the ON-duration of discontinuous reception to time duration except second time duration within the first predetermined time duration.

20. The base station apparatus according to claim 19, wherein the second time duration is determined based on time duration required to calculate the first signal in uplink.

21. The base station apparatus according to claim 19, wherein the setting section sets the On-duration of discontinuous reception based on a resource usage amount in each time frame.

22. The base station apparatus according to claim 20, wherein the setting section sets the On-duration of discontinuous reception based on a resource usage amount in each time frame.

23. A communication control method comprising:
setting On-duration of discontinuous reception on a user equipment performing discontinuous reception control;
allocating radio resources for a first signal in uplink for the user equipment to transmit during the On-duration of discontinuous reception to within predetermined time duration from the beginning of the ON-duration of discontinuous reception; and
wherein the first predetermined time duration to which are allocated the radio resources for the first signal in uplink is time duration between reception in downlink of a control signal to allocate radio resources for a second signal in uplink and transmission in uplink of the second signal in the user equipment.

* * * * *